United States Patent
Karaki

(10) Patent No.: US 8,175,170 B2
(45) Date of Patent: *May 8, 2012

(54) TRANSMITTER, RECEIVER, METHOD FOR TRANSMITTING, METHOD FOR RECEIVING, FIXED LENGTH SERIAL BURST DATA TRANSFER SYSTEM, SEMICONDUCTOR DEVICE, AND HYBRID SEMICONDUCTOR DEVICE

(75) Inventor: Nobuo Karaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1039 days.

This patent is subject to a terminal disclaimer.

(21) Appl. No.: 12/113,632

(22) Filed: May 1, 2008

(65) Prior Publication Data
US 2008/0279289 A1 Nov. 13, 2008

(30) Foreign Application Priority Data
May 8, 2007 (JP) .................................. 2007-123353

(51) Int. Cl.
*H04B 3/00* (2006.01)
*H04L 25/00* (2006.01)

(52) U.S. Cl. ......... 375/257; 375/259; 375/295; 375/316

(58) Field of Classification Search .................. 375/257, 375/259, 295, 316, 340
See application file for complete search history.

(56) References Cited

U.S. PATENT DOCUMENTS

| | | | |
|---|---|---|---|
| 5,199,107 A * | 3/1993 | Ozawa | 713/400 |
| 6,085,261 A * | 7/2000 | McIntyre et al. | 710/35 |
| 7,282,946 B2 * | 10/2007 | Har et al. | 326/21 |
| 2005/0041606 A1 | 2/2005 | Hori et al. | |
| 2008/0181315 A1 * | 7/2008 | Wang et al. | 375/257 |

OTHER PUBLICATIONS

Design Wave Magazine, pp. 16-17, Jul. 2005.
Jun. 15, 2011 Office Action issued in U.S. Appl. No. 12/113,688.
U.S. Appl. No. 12/113,688, filed May 1, 2008.

* cited by examiner

*Primary Examiner* — David B. Lugo
(74) *Attorney, Agent, or Firm* — Oliff & Berridge, PLC

(57) ABSTRACT

A transmitter included in a fixed length serial burst data transmission system in which the transmitter and a receiver are coupled to each other through at least two data signal lines includes a dual-rail encoder encoding fixed length serial transmit data into corresponding symbols, inserting a null symbol delimiting the data symbols, and sending out the symbols via the two data signal lines during transmission, while transmitting an invalid symbol indicating a non-transmission state to the receiver via the two data signal lines during non-transmission.

23 Claims, 17 Drawing Sheets

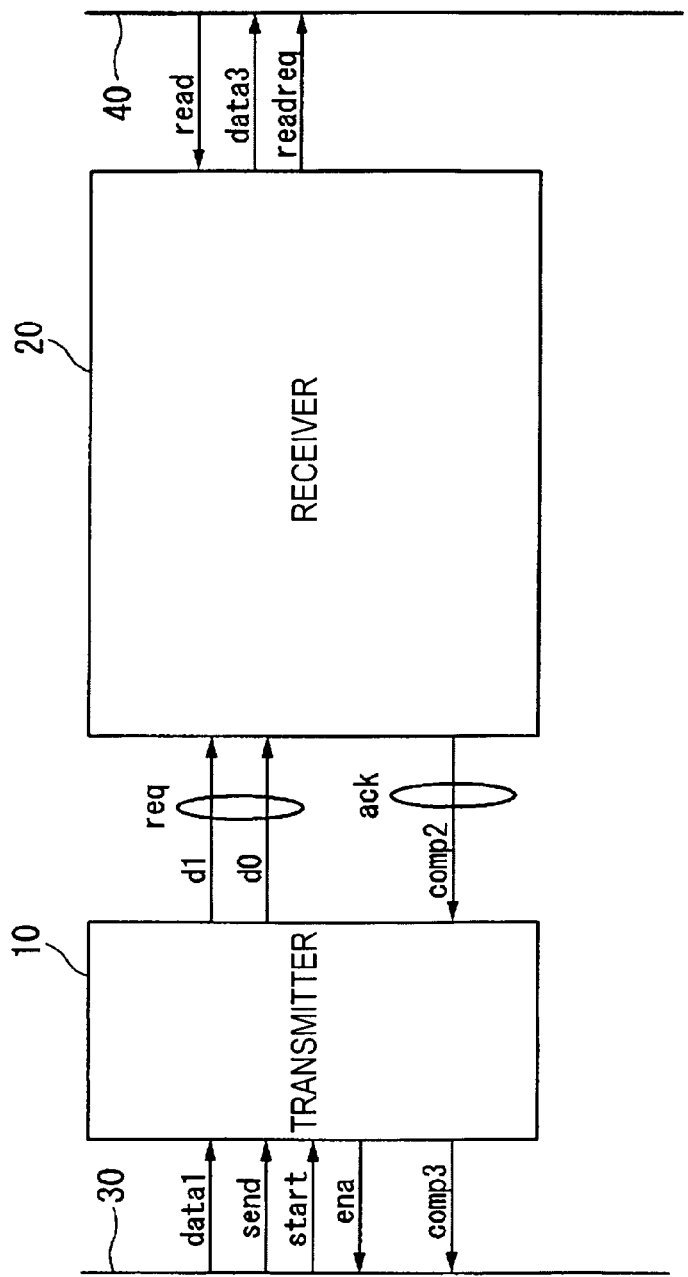

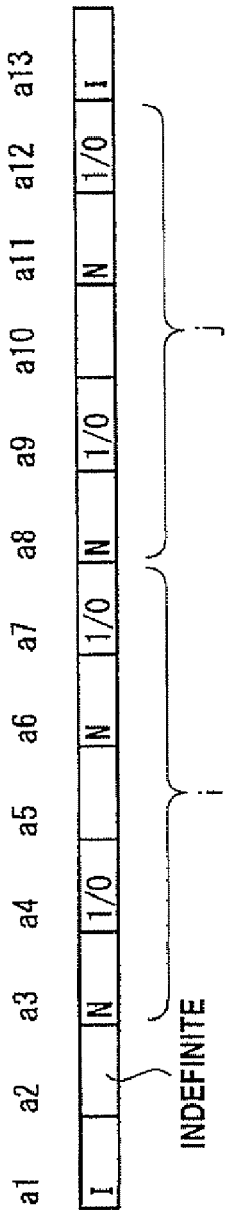
FIG.11A
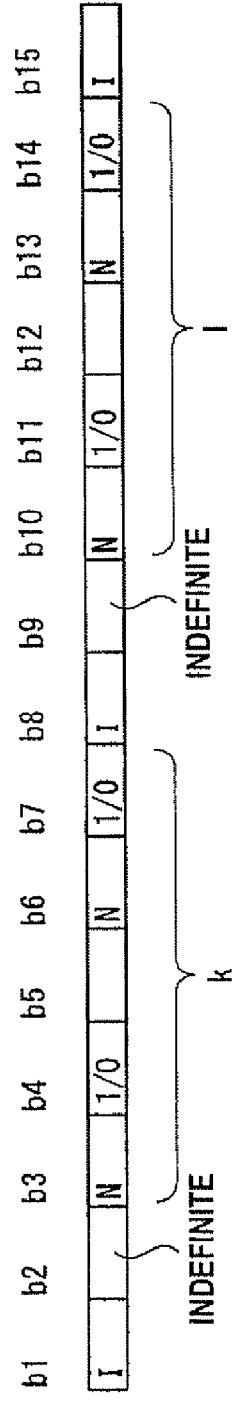
FIG.11B
| INDEX | DATA LENGTH |
|---|---|
| 0 | 8 |
| 1 | 16 |
| 2 | 32 |
| 3 | 64 |
FIG.12

TRANSMITTER, RECEIVER, METHOD FOR TRANSMITTING, METHOD FOR RECEIVING, FIXED LENGTH SERIAL BURST DATA TRANSFER SYSTEM, SEMICONDUCTOR DEVICE, AND HYBRID SEMICONDUCTOR DEVICE

The entire disclosure of Japanese Patent Application No. 2007-123353, filed May 8, 2007 is expressly incorporated by reference herein.

BACKGROUND

1. Technical Field

An aspect of the present invention relates to an asynchronous data transmission.

More specifically, in two-way or four-way handshaking communication, the invention relates to signaling for a fixed length serial burst data transmission at a high-bit-rate.

2. Related Art

Data transmission between asynchronous systems themselves has been achieved by either two-way or four-way handshaking.

Such a technique, is disclosed in *Case study of "Asynchronous processor"*, *Fundamental treatment for noise &electric power consumption in digital LSI*, Nobuo Karaki, Design Wave Magazine, pp. 64-91, July (2005).

However, in a case of transferring a serial block data having a certain length by either the two-way or four-way handshaking shown in *Case study of "Asynchronous processor"*, the overhead time of bit-by-bit handshaking leads to a long transmission time.

Therefore, a high-bit-rate serial data transmission has not been achieved by the conventional asynchronous data transmission using either two-way or four-way handshaking.

SUMMARY

An advantage of the invention is to provide a communication system achieving a high-bit-rate serial data transmission by an asynchronous data transmission using either two-way or four-way handshaking.

The transmitter, included in a fixed length serial burst data transmission system in which the transmitter and a receiver are coupled to each other through at least two data signal lines, according to a first aspect of the invention includes a dual-rail encoder encoding fixed length serial transmit data into corresponding symbols, inserting a null symbol for delimiting the symbols, and sending out the symbols to the receiver through the two data signal lines, while sending out an invalid symbol indicating a non-transmission state to the receiver through the two data signal lines during non-transmission.

This can suppress overhead time of bit-by-bit handshaking in asynchronous communication between the transmitter and the receiver when the communication starts according to a request from the transmitter. Further, as an advantage of the asynchronous communication, high-bit-rate communication with low power consumption while being robust against the environmental variations.

A transmitter, included in a fixed length serial burst data transmission system in which the transmitter and a receiver are coupled to each other through at least two data signal lines, according to a second aspect of the invention includes: a burst request receiver receiving a burst transmission request signal from the receiver through a request signal line; and a dual-rail encoder encoding fixed length serial transmit data into corresponding symbols, inserting a null symbol delimiting the symbols, and sends out the symbols to the receiver through the two data signal lines during transmission, while sending out an invalid symbol indicating a non-transmission state to the receiver through the two data signal lines during non-transmission. The Transmitter further includes a corresponding burst request receiver, which receives a burst transmission request signal.

This can suppress overhead caused by bit-by-bit handshaking in conventional asynchronous communication between the transmitter and the receiver when the communication starts according to a request from the receiver. Further, as an advantage of the asynchronous communication the transmission system can be robust against variations in temperature and operating voltages while achieving high-bit-rate communication with low power consumption.

The transmitter according to the first aspect of the invention may further include: a transmit data counter counting a number of data symbols encoded and transmitted; and a last data detector detecting if a number of transmit data counted by the transmit data counter is a predetermined number of data, and outputting a last data signal if the detected number of the transmit data is the predetermined number of data. The dual-rail encoder transmits the invalid symbol to the receiver through the two data signal lines corresponding to receiving the last data signal from the last data detector.

This allows the transmitter to detect communication completion and output the invalid symbol by using the handshaking of asynchronous communication.

A receiver, included in a fixed length serial burst data transmission system in which a transmitter and the receiver are coupled to each other through at least two data signal lines, according to a third aspect of the invention includes: a memory storing receiving data; a dual-rail decoder receiving and decoding encoded symbols based on a null symbol included in the received fixed length serial transmit data, and storing the decoded fixed length serial transmit data in the memory as receiving data, the fixed length serial transmit data having symbols corresponding to each piece of the transmit data, having the null symbol inserted between the data symbols to delimit the symbols, and being output to the receiver through the two data signal lines during transmission, while an invalid symbol indicating a non-transmission state is output to the receiver through the two data signal lines during non-transmission; a receiving data counter counting a number of pieces of the receiving data stored in the memory by the dual-rail decoder; a detector detecting if the number of pieces of the receiving data counted by the receiving data counter is a predetermined number of pieces of data, and outputting a detection signal if the detected number of the pieces of the receiving data is the predetermined number of pieces of data; and a receiving completion reporter transmitting a receiving completion signal to the transmitter corresponding to receiving the detection signal from the detector.

A receiver, included in a fixed length serial burst data transmission system in which a transmitter and the receiver are coupled to each other through at least two data signal lines, according to a fourth aspect of the invention includes: a burst request transmitter transmitting a burst transmission request signal to the transmitter through a request signal line; a memory storing receiving data; a dual-rail decoder receiving and decoding encoded symbols based on a null symbol included in the received fixed length serial transmit data, and storing the decoded fixed length serial transmit data in the memory as receiving data, the fixed length serial transmit data having symbols corresponding to each piece of the transmit data, having the null symbol inserted between the symbols to delimit the symbols, and being output to the receiver through the two data signal lines during transmission, while an invalid symbol indicating a non-transmission state is output to the receiver through the two data signal lines during non-transmission; a receiving data counter counting a number of pieces of the receiving data stored in the memory by the dual-rail decoder; a detector detecting if the number of pieces of the receiving data counted by the receiving data counter is a predetermined number of pieces of data, and outputting a detection signal if the detected number of the pieces of the receiving data is the predetermined number of pieces of data; and a receiving completion reporter transmitting a receiving completion signal corresponding to receiving the detection signal from the detector.

The receiver according to the third aspect of the invention may further include: a data invalid signal generator outputting a data invalid signal for indicating that the receiving data is not stored from when an invalid symbol signal is input until when a null symbol signal is input to the receiver in a case where the invalid symbol signal and the null symbol signal are input from the dual-rail decoder; and a strobe signal generator receiving a write signal output from the dual-rail decoder, outputting the write signal to the memory, and holding back from outputting a strobe signal when the data invalid signal is input from the data invalid signal generator, wherein the dual-rail decoder outputs the receiving data to the memory, stores the receiving data in the memory by outputting the write signal to the memory while the receiving data is being output to the memory, outputs the null symbol signal in a case of decoding the null symbol included in the received fixed length serial transmit data, and outputs the invalid symbol signal in a case of decoding the invalid symbol included in the received fixed length serial transmission data.

According to the above, such effects are obtained that the receiver can safely capture the data even with hazards on the data line.

Further, the receiver according to the third aspect of the invention may still further include a serial-to-parallel converter converting the binary serial data to parallel data of a predetermined number of bits.

This allows the receiver to store serial data being received as parallel data.

Furthermore, the receiver according to the third aspect of the invention may further include a data length setting unit extracting burst transmit data length information from the extracted received fixed length serial transmit data and setting a number of pieces of the transmit data of the burst transmit data length information as the predetermined number of pieces of data, wherein the fixed length serial transmission data of the dual-rail decoder receiving from the transmitter includes the number of pieces of the burst transmit data that is information of a number of pieces of the transmit data for transmitting at a time by burst transmission.

This enables transmission and reception of variable serial transmit data.

A method for transmitting by a transmitter included in a fixed length serial burst data transmission system in which the transmitter and a receiver are coupled to each other through at least two data signal lines according to a fifth aspect of the invention includes: encoding each bit of the fixed length serial data into a corresponding symbol delimited by a null symbol; and sending out the symbols to the receiver through the two data signal lines during transmission, while transmitting an invalid symbol indicating a non-transmission state to the receiver through the two data signal lines during non-transmission.

Further, a method for transmitting by a transmitter included in a fixed length serial burst data transmission system in which the transmitter and a receiver are coupled to each other through at least a request signal line and two data signal lines according to a sixth aspect of the invention includes: encoding each bit of the fixed length serial data into corresponding symbols delimited by a null symbol; and sending out the encoded symbols to the receiver through the two data signal lines during transmission, while transmitting an invalid symbol indicating a non-transmission state to the receiver through the two data signal lines during non-transmission, on the condition that the transmitter receives a burst transmission request signal from the receiver through the request signal line.

The method according to the fifth aspect of the invention for transmitting by the transmitter may further include: counting a number of data symbols encoded and transmitted; detecting if a counted number of pieces of data is a predetermined number of data; outputting a last data signal if the counted number is detected as the predetermined number of data; and transmitting the invalid symbol to the receiver through the two data signal lines when the last data signal is input.

A method for receiving by a receiver included in a fixed length serial burst data transmission system in which a transmitter and the receiver are coupled to each other through at least two data signal lines according to a seventh aspect of the invention includes: receiving the fixed length serial transmit data from the transmitter by receiving a series of symbols delimited by a null symbol via the two data signal lines during transmission, outputting an invalid symbol signal in response to an invalid symbol received from the transmitter for an interval period of transmission state, wherein the transmitter sends out an invalid symbol indicating a non-transmission state via the two data signal lines during non-transmission; decoding data series of the symbols received into binary serial data, storing the binary data in the memory; counting a number of pieces of the receiving data stored in the memory; detecting if the counted number of the pieces of the receiving data number is a predetermined number of pieces of data; outputting a detection signal if the number of the pieces of the receiving data is detected as the predetermined number of pieces of data; and transmitting a receiving completion signal to the transmitter corresponding to that the detection signal is input.

A method for receiving by a receiver included in a fixed length serial burst data transmission system in which a transmitter and the receiver are coupled to each other through at least two data signal lines according to an eighth aspect of the invention includes: sending out a burst transmission request signal to the transmitter through a request signal line; receiving a series of symbols of fixed length serial data sent out by the transmitter in response to the burst transmission request signal; receiving an invalid symbol representing a non-transmission state via the two data signal lines from the transmitter during an interval period of non-transmission state; decoding the null symbol delimiting the symbols of fixed length serial data and outputting the null symbol signal; outputting an invalid symbol signal when an invalid symbol is decoded; and decoding a series of symbols of fixed length serial data and storing the decoded binary data in the memory; counting a number of pieces of the receiving data stored in the memory; detecting if the counted number of the pieces of the receiving data number is a predetermined number of pieces of data; outputting a detection signal if the number of the pieces of the receiving data is detected as the predetermined number of pieces of data; and transmitting a receiving completion signal corresponding to that the detection signal is input.

The method for receiving by the receiver according to the seventh aspect of the invention may further include: decoding and outputting the receiving data to a memory; outputting a write signal to the memory for an appropriate time while the receiving data is being output to the memory; outputting a null symbol signal in a case of decoding the null symbol included in the received fixed length serial transmit data; outputting an invalid symbol signal in a case of decoding the invalid signal included in the received fixed length serial transmission data; outputting a data invalid signal for indicating that the receiving data is not stored from when the invalid symbol signal is input until when the null symbol signal is input to the receiver in a case where the invalid symbol signal and the null symbol signal are input from the dual-rail decoder, and masking the write signal when the data invalid signal is input.

The method for receiving by the receiver according to the seventh aspect of the invention may still further include converting the receiving data from a serial form to a predetermined bit number in parallel form; and storing the receiving data converted in parallel form in the memory.

The method for receiving by the receiver according to the seventh aspect of the invention may yet further include: extracting burst transmit data length information from the received fixed length serial transmit data; and setting a number of pieces of the transmit data of the extracted burst transmit data length information as the predetermined number of data, wherein the received fixed length serial transmission data includes the number of pieces of the burst transmit data that is information of the number of the pieces of the transmit data for transmitting at a time by burst transmission.

A fixed length serial burst data transmission system according to a ninth aspect of the invention includes a transmitter and a receiver coupled to the transmitter through at least two data signal lines. The transmitter includes a dual-rail encoder encoding each bit of the serial data into a corresponding symbol, inserting a null symbol delimiting the data symbols, and sends out the symbols via the two data signal lines to the receiver. For a period of non-transmission state, the transmitter sends out an invalid symbol representing a non-transmission state to the receiver through the two data signal lines during non-transmission. The receiver includes: a memory storing receiving data; a dual-rail decoder decodes a series of fixed length serial data from the transmitter into binary data based on a null symbol included in the received fixed length serial data, and storing the binary data in the memory; a receiving data counter counting a number of pieces of the receiving data stored in the memory by the dual-rail decoder; a detector detecting if the number of pieces of the receiving data counted by the receiving data counter is a predetermined number of pieces of data, and outputting a detection signal if the detected number of the pieces of the receiving data is the predetermined number of pieces of data; and a receiving completion reporter transmitting a receiving completion signal to the transmitter corresponding to receiving the detection signal from the detector.

A fixed length serial burst data transmission system according to a tenth aspect of the invention includes a transmitter, and a receiver being coupled to the transmitter through at least a request signal line and two data signal lines. The transmitter includes: a burst request receiver receiving a burst transmission request signal from the receiver; and a dual-rail encoder encoding each bit of the serial into a corresponding symbol, inserting a null symbol delimiting the symbols, and sending out the symbols to the receiver through the two data signal lines, while transmitting an invalid symbol indicating a non-transmission state to the receiver through the two data signal lines during a period of non-transmission, on the condition that the burst request receiver receives the burst transmission request signal. The receiver includes: a burst request transmitter transmitting the burst transmission request signal to the transmitter; a memory storing receiving data; a dual-rail decoder receiving and decoding a series of symbols of fixed length serial data received from the transmitter into binary data; outputting a null symbol signal when an invalid symbol is decoded; decoding the series of data symbols and storing the decoded binary data in the memory; a receiving data counter counting a number of pieces of the receiving data stored in the memory by the dual-rail decoder; a detector detecting if the number of pieces of the receiving data counted by the receiving data counter is a predetermined number of pieces of data, and outputting a detection signal if the detected number of the pieces of the receiving data is the predetermined number of pieces of data; and a receiving completion reporter transmitting a receiving completion signal corresponding to receiving the detection signal from the detector.

In the fixed length serial burst data transmission system according to the ninth aspect of the invention, the data signal lines may be made of an electrically conductive metal.

In the fixed length serial burst data transmission system according to the ninth aspect of the invention, the data signal lines may be made of an optic fiber, and the dual-rail encoder may include a plurality of light emitters outputting signals representing pairing bits of symbols delimited by a null symbol via a plurality of optical fibers; the symbol includes a null symbol and an invalid symbol; while the dual-rail decoder may include an optical receiver to receive the symbols through the optic fiber.

This allows a high-bit-rate serial data transmission system to stably communicate with less electromagnetic interference from the environment.

Further, in the fixed length serial burst data transmission system, the light emitter may perform high-frequency modulation on an optical output corresponding to the data symbol, while the light receiver may receive and demodulate the high-frequency light in accordance with the symbol. As such, a single optical cable can conduct the symbol encoded in the dual-rail encoding scheme.

A semiconductor device according to an eleventh aspect of the invention includes the fixed length serial burst data transmission system according to the ninth aspect of the invention formed on a single silicon substrate.

This enables communication of a circuit in a semiconductor device formed on a single silicon substrate with the high-bit-rate serial data transmission system according to the ninth aspect of the invention.

A hybrid semiconductor device according to a twelfth aspect of the invention may includes the fixed length serial burst data transmission system according to the ninth aspect of the invention formed on a plurality of various silicon substrates.

This enables communication of a circuit in a semiconductor device consisting of a plurality of silicon substrates with the high-bit-rate serial data transmission system.

BRIEF DESCRIPTION OF THE DRAWINGS

The invention will is briefly described by using drawings.
FIG. 1 is a block diagram schematically illustrating a configuration of a high-bit-rate serial data transmission system according to the first embodiment of the invention.

FIG. 2 is a truth table of the dual-rail encoding scheme adopted by the transmitter and the receiver of the high-bit-rate serial data transmission system.

FIGS. 11A and 11B are diagrams explaining the method to include burst length setting information into transmit data for burst communication.

FIG. 12 is a table showing the correspondence table of burst data lengths as an example.

DESCRIPTION OF EXEMPLARY EMBODIMENTS

First Embodiment

Figure 3:
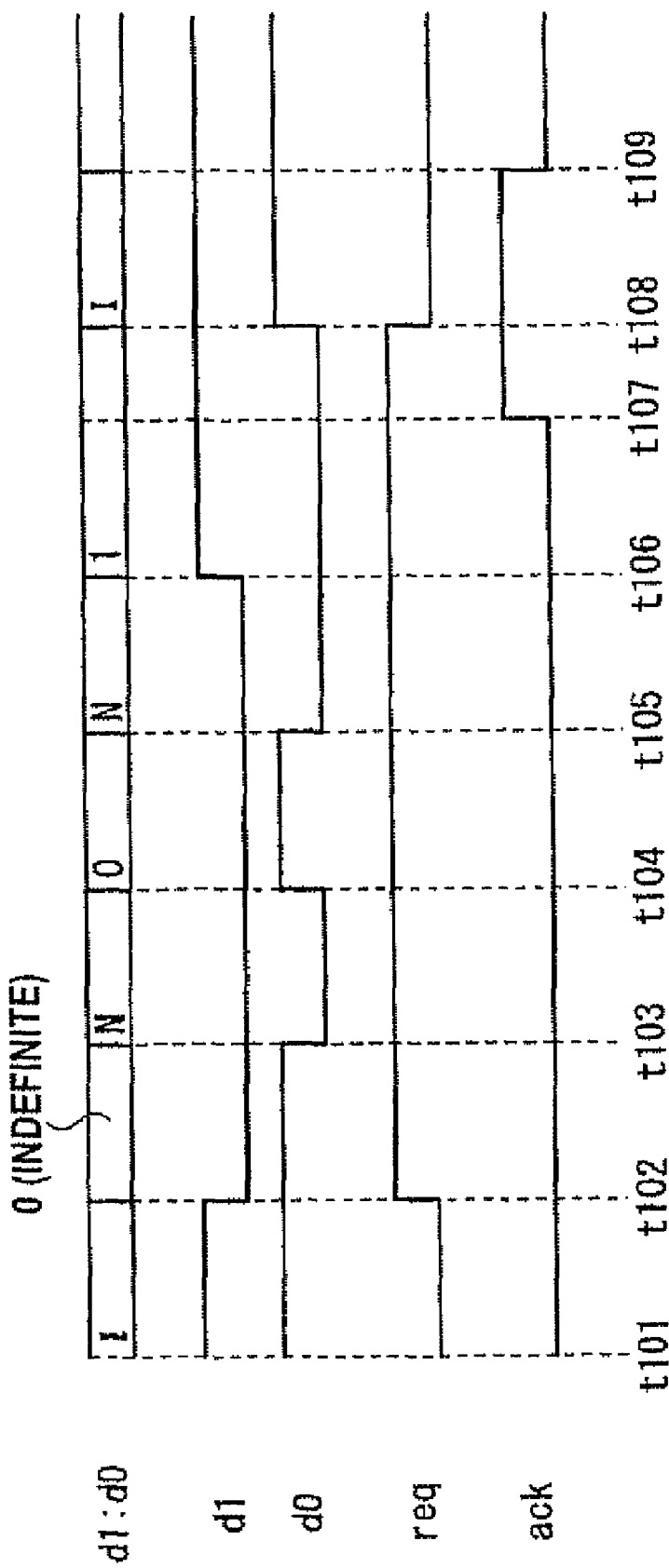
FIG. 3 is a timing chart indicating an operation of the high-speed serial data transmission system according to the first embodiment.

A Combination of an Active Transmitter and a Passive Receiver

Embodiments of the invention are described in detail below with references to the drawings. FIG. 1 is a block diagram schematically illustrating a configuration of a high-bit-rate serial data transmission system (fixed length serial burst data transmission system at high-bit-rate) according to a first embodiment of the invention. The high-bit-rate serial data transmission system according to the first embodiment is a combination of an active transmitter and a passive receiver.

Further, an active transmitter and a passive receiver refer to a communication system in which a transmitter actively starts the communication by firstly sending a request to the receiver which starts to receive by outputting the start signal in response to the corresponding request. In this invention, the request is the first null symbol after the last invalid symbol.

The high-bit-rate serial data transmission system includes a transmitter 10 for a high-bit-rate serial data transmission, and a receiver 20 for a high-bit-rate serial data transmission. The transmitter 10 for a high bit-rate serial data transmission and the receiver 20 for a high bit-rate serial data transmission are coupled to each other via two data signal lines, "d0" and "d1". Further, the transmitter 10 and the receiver 20 for transferring high-bit-rate serial data are coupled to each other via a confirmation signal line 'comp2'. In a description below, the "transmitter 10 for a high-bit-rate serial data transmission" is referred to as the "transmitter 10," and the "receiver 20 for a high-bit-rate serial data transmission" is referred to as the "receiver 20." The data signal line "d0" and the data signal line "d1" respectively can be made of metal, for example. In addition, the confirmation signal line 'comp2' may also be made of metal. Further, the transmitter 10 transmits and receives transmission data 'data1', a transmission control signal 'send', a reception enable signal 'ena', a burst communication start signal 'start', and a confirmation signal line 'comp3' through a transmission control bus 30. Further, the receiver 20 transmits and receives a read signal 'read', transmission data 'data3', and a read request signal 'readreq' through a receiver control bus 40.

Next, explanations on the transmitter 10, and the receiver 20 will be given. Here, between the transmitter 10 and the receiver 20, a case where the number of pieces of burst data that is the number of pieces of data to be transmitted or received in one burst transmission is preliminarily defined.

The transmitter 10 transmits a signal for indicating that the transmitter 10 is transmittable (L) or untransmittable (H) with respect to the receiver 20 to the transmission control bus 30 by the reception enable signal 'ena'.

Further, the transmitter 10 starts a burst transmission by the communication start signal 'start' input from the transmission control bus 30. Corresponding to the start of the burst transmission, the transmitter 10 makes the reception enable signal 'ena' be at an H level, transmitting a signal indicating an untransmittable state to the transmission control bus 30.

Further, after the start of the burst transmission, the transmitter 10 receives the transmit control signal 'send' and the transmission data 'data1' input from the transmission control bus 30. Then, based on the transmit control signal 'send' having been input, the transmit data 'data1' is encoded and transmitted to the receiver 20 via the two data transmit lines d0 and d1. The encoding will be described later.

Further, the transmitter 10 counts the number of pieces of the data having been transmitted. When it is detected that the number of pieces of the data transmitted reaches a predetermined number of pieces of burst data, the reception enable signal 'ena' is made to be at an L level so as to output a signal indicating that it is transmittable to the transmission control bus 30.

Further, the transmitter 10 receives an acknowledged signal 'ack' that is the confirmation signal line 'comp2' at the H level through the confirmation signal line 'comp2' from the receiver 20, detecting that the receiver 20 has received all the transmit data. Further, corresponding to the reception of the acknowledged signal 'ack' through the confirmation signal line 'comp2', the transmitter 10 transmits an acknowledged signal 'ack' that is the confirmation signal line 'comp3' at the H level through the confirmation signal line 'comp3' to the transmission control bus 30.

The receiver 20 receives the transmit data that has been encoded from the transmitter 10 through the two data signal lines d0 and d1, and then decodes and stores the data in a memory inside the receiver 20.

Further, the receiver 20 counts the number of pieces of the data having been received. When it is detected that the number of pieces of the data received reaches the predetermined number of pieces of the burst data, the receiver 20 transmits the acknowledged signal 'ack' that is the confirmation signal line 'comp2' at the H level to the transmitter 10 through the confirmation signal line 'comp2'.

Further, corresponding to the input of the read signal 'read' from the receiver control bus 40, the receiver 20 outputs the transmit data stored in the memory inside as the data 'data 3' to the receiver control bus 40.

Furthermore, corresponding to an amount of the transmit data stored in the memory inside, the receiver 20 outputs the read request signal 'readreq' indicating a request for reading the data stored in the receiver 20 to the receiver control bus 40.

As described later, the transmitter 10 and the receiver 20 are communicated by four way handshaking in which the two data signal lines d0 and d1 serve as request signal lines while the confirmation signal line 'comp2' serves as a confirmation signal line.

The transmission control bus 30 is coupled to a central processing unit (CPU) and a dedicated hardware logic that is in charge of controlling the transmitter 10, which sends the transmission data to the receiver 20.

The receiver control bus 40 is coupled to a CPU and a dedicated hardware logic that is in charge of controlling the receiver 20, which receives the transmission data from the transmitter 10.

[Dual-Rail Encoding]

Next, encoding at the two data signal lines d0 and d1 coupling the transmitter 10 and the receiver 20 is described below.

Each bit of the serial data is encoded into a corresponding symbol, which consists of two bits and is sent out via the data signal lines: "d0" and "d1." The signal on the data signal lines swings in voltage between a high level and a low level of binary logic. From now, the high level is represented as "H" or "1," while the low level is represented as "L" or "0."

Symbols: "Invalid," "1," "0," and "Null" are represented by the two data signal lines d0 and d1, as shown in FIG. 2. Here in FIG. 2, a combination of value {1,1} of the data line {d0,d1} represents a symbol "Invalid". Further, a combination of value {0,0} of the data line {d0,d1} represents a symbol "Null". Furthermore, a combination of value {1,0} of the data line {d0,d1} represents a symbol "0", while a combination of value {0,1} of the data line {d0,d1} represents a symbol "1."

The symbol "0" and the symbol "1" represent each bit of binary serial data. The symbol "0" corresponds to value "0" of a bit of the data, while the symbol "1" corresponds value "1" of a bit of the data. In the description below, the symbol "0" is represented as the "symbol 0," while the symbol "1" is represented as the "symbol 1." Further, the symbol 0 and the symbol 1 are represented by a "transmission data symbol."

Further, the symbol "Invalid" is represented by a "symbol I," while the symbol "Null" by a "symbol N."

Further, in the description below, the encoding scheme described above is referred to as two-wire encoding.

In the dual-rail encoding, the transmit data 0 or 1 is correspondingly encoded to the symbol 0 or 1, and then the symbol N is automatically placed in front of either symbol 0 or 1 by the encoder.

Symbol N placed in front of each symbol 0 and 1 leads to a symbol N automatically inserted between the symbols 0 and 1. Further, the symbol N inserted between the symbols can act as a delimiter whereby the boundary of symbols 0 and 1 can be easily detected.

[Operations of Transmitter 10 and Receiver 20]

Next, referring to FIG. 3, the operations of the transmitter 10 and the receiver 20 through the two data signal lines d0 and d1 by the dual-rail encoding described above will be explained. In this case, for example the transmitter 10 transmits performs burst transmission of just two bits of data, 'data 0' and 'data 1.' That is, a case where the number of pieces of the burst data between the transmitter 10 and the receiver 20 is 2, will be explained. In the description below, the points of time illustrated in the figures are indexed in ascending order so that, if i<j, $t_i < t_j$, where i and j are integers and $t_i$ stands for a point of time indexed by i, where i is an arbitrary natural number.

First, at a timing $t_{101}$ that is before transmission, the transmitter 10 transmits the symbol I. Corresponding to the transmission control bus master starting the burst transmission, the transmitter 10 starts transmitting the transmit data, and transmits the symbol N at $t_{103}$.

The symbol I is represented by 1s on both d0 and d1 while the symbol N is represented by 0s on both d0 and d1. Accordingly, it theoretically can be expected that d0 and d1 swing from 1 to 0. However, due to difference of wiring lengths between circuits, and variation of delay timing of elements executing transmission, timing in which the data signal line d0 and d1 are changed from the H level to the L level may vary in some cases. Therefore, when the symbol I is changed to the symbol N, a hazard may occur in some cases.

Given that the signal on d1 is changed from the H level to the L level at a timing $t_{102}$, while the signal on d0 is changed from the H level to the L level at a timing $t_{103}$, and thus the symbol 0, represented by signals {1,0} on d0 and d1, is output in a period between the timing $t_{102}$ and the timing $t_{103}$. The symbol 0 for the period between the timing $t_{102}$ and the timing $t_{103}$ is exactly a hazard. So far, it shall be reasonably supposed that data appearing on the data signal lines: d0 and d1 is undetermined and then either a symbol 0 or the symbol 1 appears during the period of time from $t_{102}$ to $t_{103}$.

Next, the transmitter 10 transmits the symbol 0 at a timing $t_{104}$. The receiver 20 receives the symbol 0 as the transmit data symbol, and counts the transmit data symbol, so that the receiver 20 makes the number of pieces of receiving data be 1.

Next, the transmitter 10 transmits the symbol N at a timing $t_{105}$, and outputs the symbol 1 at a timing twos. The receiver 20 receives the symbol 1 as the transmit data symbol at the timing $t_{106}$. After counting the received transmit data symbol, the receiver 20 makes the number of pieces of receiving data be 2.

By detecting that the number of pieces of the receiving data is 2, the receiver 20 transmits the acknowledged signal 'ack' that is the confirmation signal line 'comp2' at the H level to the transmitter 10 thorough the confirmation signal line 'comp2'.

Corresponding to that the transmitter 10 receives the acknowledged signal 'ack' that is the confirmation signal line 'comp2' at the H level from the receiver 20, the transmitter 10 transmits the symbol I at a timing twos to the receiver 20 through the data signal lines d0 and d1.

Corresponding to reception of the symbol I transmitted from the transmitter 10, the receiver 20 makes the confirmation signal line 'comp2' be at the L level at a timing $t_{109}$ so as to terminate outputting the acknowledged signal 'ack' that is the confirmation signal line 'comp2' at the H level.

According to the above, the transmitter 10 and the receiver 20 communicate each other by the four-way handshaking in which the data signal lines d0 and d1 serve as request signal lines while the confirmation signal line 'comp2' serves as a confirmation signal line.

The four-way handshaking will be explained by adding a request signal line 'req' to FIG. 3. The request signal line 'req' is a signal line used only for explanation purpose.

The request signal line 'req' is a signal line that is at the L level when a symbol that the data signal lines d0 and d1 carry is the symbol I, while it is at the H level when the symbol is other than the symbol I, that is, when the symbol is the symbol 1, the symbol 0, or the symbol N.

When only the request signal line 'req' and the confirmation signal line 'comp2' are focused, the transmitter 10 and the receiver 20 communicate each other as below.

Before the communication, the transmitter 10 has the request signal line 'req' at the L level while the receiver 20 has the confirmation signal line 'comp2' at the L level.

Next, the transmitter 10 makes the request signal line 'req' be at the H level at the timing $t_{102}$. Then, corresponding to that the request signal line 'req' is at the H level, the receiver 20 makes the confirmation signal line 'comp2' be at the H level at the timing $t_{107}$.

Next, corresponding to that the confirmation signal line 'comp2' is at the H level, the transmitter 10 makes the request signal line 'req' be at the L level at the timing $t_{109}$. Next, corresponding to that the request signal line 'req' is at the L level, the confirmation signal line 'comp2' is made to be at the L level at the timing $t_{109}$. Accordingly, the transmitter 10 has the request signal line 'req' at the L level while the receiver 20 has the confirmation signal line 'comp2' at the L level, so that the transmitter 10 and the receiver 20 are back in the state before the communication.

According to the above, when only the request signal line 'req' and the confirmation signal line 'comp2' are focused, the transmitter 10 and the receiver 20 communicate each other by the four way handshaking.

Further, while communicating each other by the four way handshaking with the request signal line 'req' and the confirmation signal line 'comp2', the transmitter 10 and the receiver 20 perform burst transmitting and receiving to transmit and receive data by the symbol 0, the symbol 1, and the symbol N during a period that the request signal line 'req' is at the H level, that is, a period in which the data signal lines d0 and d1 do not transmit the symbol I.

Further, since the symbol N is inserted between the symbol 0 and the symbol 1 during the burst transmitting and receiving, even when the data 0s or the data 1s are successively arranged, the receiver 20 can separately extract the data 0s and the data 1s by using the symbol N.

[Configuration of Transmitter 10]

Figure 4:
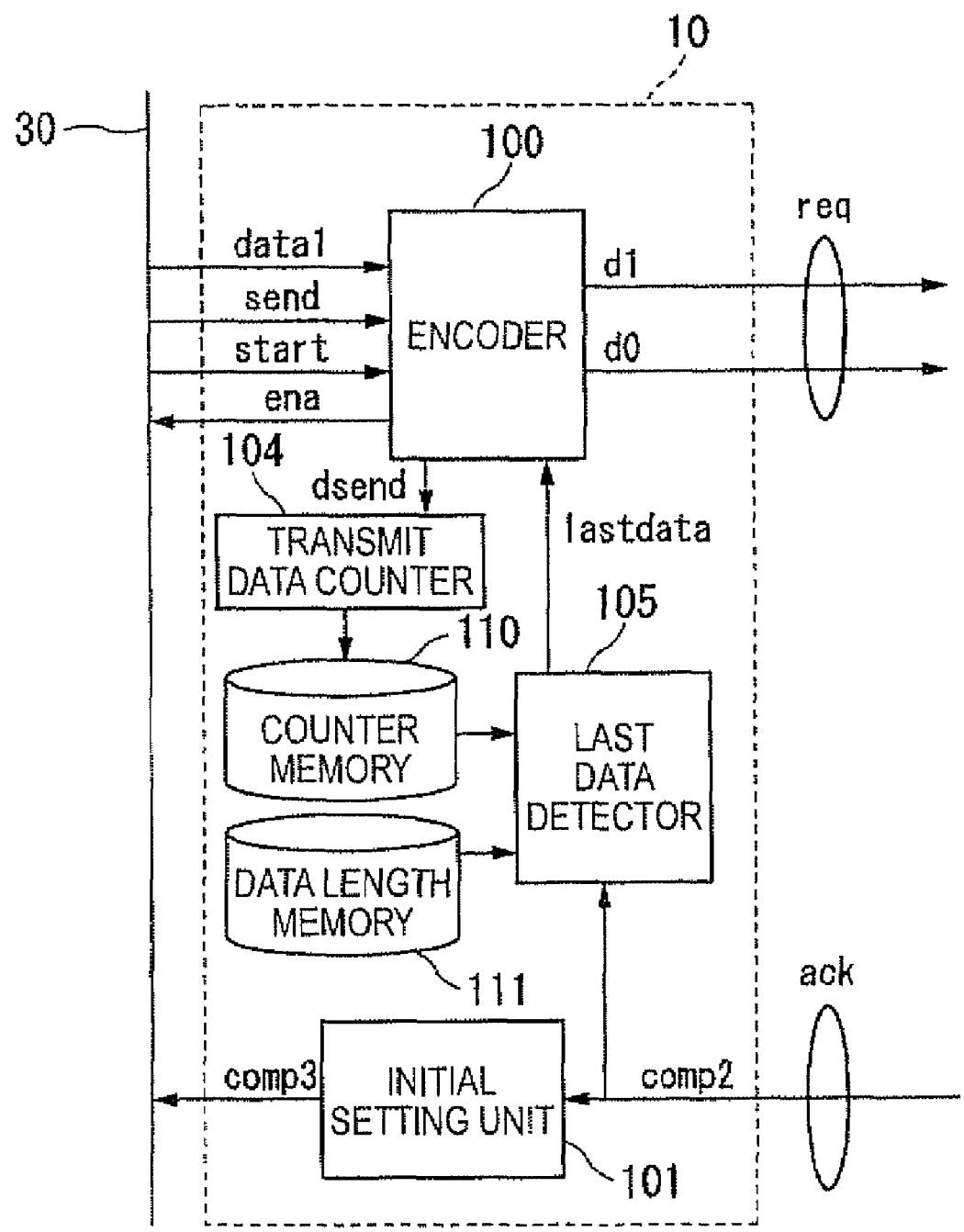
FIG. 4 is a block diagram schematically illustrating the configuration of the transmitter according to the first embodiment.

Next, a configuration of the transmitter 10 will be described with reference to FIG. 4. In FIG. 4, parts which correspond to those of FIG. 1 will be indexed by using the same reference numbers, and the description thereof is left out.

The transmitter 10 includes an encoder 100, an initial setting unit 101, a transmit data counter 104, a last data detector 105, a counter memory 110, and a data length memory 111.

Between the transmitter 10 and the receiver 20, the number of pieces of data to be transmitted at a time by a burst transmission is preliminarily stored in the data length memory 111 as the number of pieces of the burst data. The number of pieces of the burst data is a value such as 8, 16, 32, or 64, for example.

Further, the number of pieces of the burst data stored in the data length memory 111 is equal to the number of pieces of the burst data stored in a data length memory 211 that is included in the receiver 20 and will be described later.

The counter memory 110 stores the number of pieces of the data transmitted from the transmitter 10 as the number of pieces of the transmit data. The number of pieces of the data having been transmitted is stored in the transmit data counter 104 as described later. The encoder 100 transmits the reception enable signal 'ena' to the transmission control bus 30. The reception enable signal 'ena' is a signal for indicating that the transmitter 10 is in a state that is transmittable (H) or untransmittable (L) to the receiver 20.

Further, the transmitter 100 starts burst transmission corresponding to an input of the communication start signal 'start' at the H level from the transmission control bus 30. Corresponding to the start of the burst transmission, the encoder 100 makes the reception enable signal 'ena' be at the L level, transmitting a signal indicating an untransmittable state to the transmission control bus 30.

Further, after the burst transmission has started, the encoder 100 receives the transmit control signal 'send' and the transmission data 'data1' input from the transmission bus 30. Then, based on the transmit control signal 'send' having been input, the encoder 100 encodes and transmits the transmission data 'data1' to the receiver 20 via the two data transmit lines d0 and d1.

The encoder 100 encodes the transmission data 'data1' to the symbol 1, for example, if the communication start signal 'start' is at the L level and the transmit control signal 'send' is at the L level. Further, the encoder 100 encodes the transmission data 'data1' if the communication start signal 'start' is at the H level and the transmit control signal 'send' is at the L level to the symbol N. Furthermore, when the communication start signal 'start' is at the H level and the transmit control signal 'send' is at the H level, the encoder 100 encodes the transmission data 'data1' to the symbol N if the transmission data 'data1' is the data 0. On the contrary, the encoder 100 encodes the transmission data 'data1' to the symbol 1 if the transmission data 'data1' is the data 1.

That is, during transmission of a fixed length serial data, the encoder 100 encodes each bit of the data on "data1" into a symbol (symbol 0 or symbol 1) delimited by a null symbol (symbol N), and then sends out the output to the receiver via the two data signal lines. For a period of non-transmission state, the transmitter sends out an invalid symbol (symbol I) representing a non-transmission state is transmitted to the receiver via the two data signal lines.

Further, the encoder 100 outputs the symbol I corresponding to an input of a last data signal 'lastdata' at the H level from the last data detector 105 described later.

On corresponding to the input of the last data signal 'lastdata' at the H level from the last data detector 105, the encoder 100 outputs the reception enable signal 'ena' at the L level to the transmission control bus 30 so as to transmit a signal indicating a transmittable state.

Further, the encoder 100 outputs the transmit control signal 'send' to the transmit data counter 104 as a transmit signal 'dsend'. The encoder 100 generates the symbols with a state machine to output to the data signal lines d0 and d1 under the conditions described above. Therefore, the symbols to output to the data signal lines d0 and d1 are not changed under conditions other than the above.

The transmit data counter 104 increments the number of pieces of the transmit data stored in the transmit data counter 104 corresponding to the transmit signal 'dsend' input from the encoder 100.

For example, corresponding to the input of the transmit signal 'dsend', the transmit data counter 104 reads the number of pieces of the transmit data stored in the transmit data counter 104. After incrementing the number of pieces of the transmit data being read by one, the transmit data counter 104 stores the number of pieces of the transmit data incremented. According to the above, the transmit data counter 104 increments the number of pieces of the transmit data stored in the transmit data counter 104 by updating the number of pieces of the transmit data stored in the transmit data counter 104.

After reading the number of pieces of the transmit data from the counter memory 110, and reading the number of pieces of the burst data from the data length memory 111, the last data detector 105 detects whether the number of pieces of the transmit data and the number of pieces of the burst data correspond with each other.

Further, in a case of detecting that the number of pieces of the transmit data and the number of pieces of the burst data correspond with each other, the last data detector 105 outputs the last data signal lastdata' at the H level to the encoder 100.

Further, when receiving a receiving completion signal that is the confirmation signal line 'comp2' at the H level from the receiver 20, the last data detector 105 outputs the last data signal 'lastdata' at the L level to the encoder 100.

Furthermore, when receiving the receiving completion signal that is the confirmation signal line 'comp2' at the H level from the receiver 20, the initial setting unit 101 outputs the receiving completion signal that is the confirmation signal line 'comp2' at the H level having been received to the transmission control bus 30 as the confirmation signal line 'comp3' at the H level.

[Configuration of Receiver 20]

Figure 5:
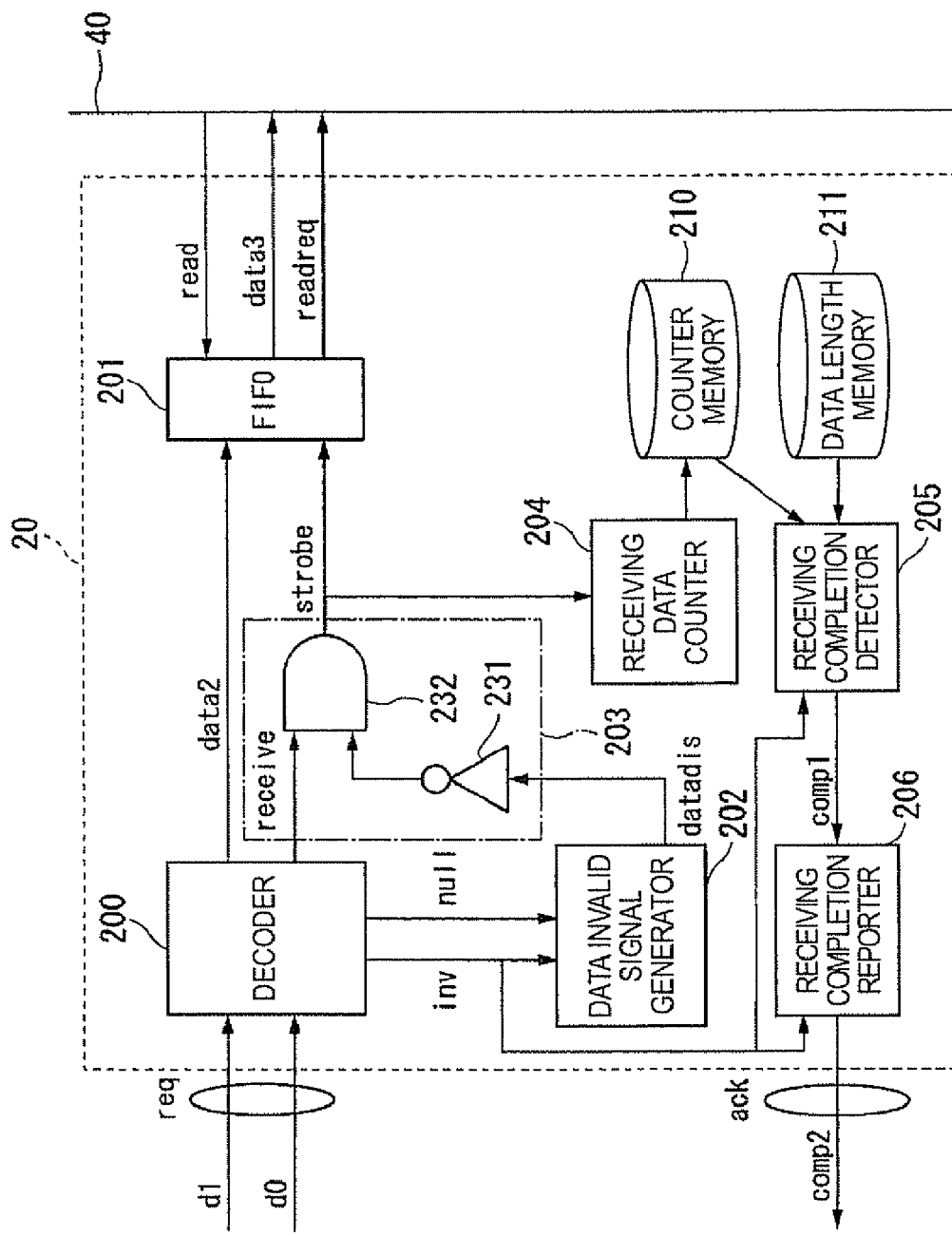
FIG. 5 is a block diagram schematically illustrating the configuration of the receiver according to the first embodiment.

A configuration of the receiver 20 will be described in detail below with reference to FIG. 5. In FIG. 5, parts which correspond to those of FIG. 1 are indexed using the same numbers and the description thereof is left out.

The receiver 20 consists of a decoder 200, a First-in First-out (FIFO) 201, a data invalid signal generator 202, a strobe signal generator 203, a receiving data counter 204, a receiving completion detector 205, a receiving completion reporter 206, a counter memory 210, and the data length memory 211.

Between the transmitter 10 and the receiver 20, the number of pieces of data to be transmitted at a time by a burst transmission is preliminarily stored in the data length memory 211 as the number of pieces of the burst data.

The counter memory 210 stores the number of pieces of the data that the transmitter 20 has received as the number of pieces of the receiving data. The number of pieces of the data having been received is stored in the receiving data counter 204 as described later.

The decoder 200 decodes a symbol sent from the transmitter 10, which encodes data into the symbols by using the dual-rail encoding scheme via the data signal lines d0 and d1. Then, the decoder 200 outputs the receiving data decoded by corresponding to the symbol 0 or the symbol 1 of the transmit data to the FIFO 201 as receiving data 'data 2'. Data on "data2" is 1 or H for symbol "1," as well as 0 or L for symbol "0."

Further, the decoder 200 outputs the data receiving signal 'receive' at the H level to the strobe signal generator 203 corresponding to a change of the decoded data from the symbol I or the symbol N to the symbol 0 or the symbol 1.

The decoder 200 generates a data receiving signal 'receive' by an EXOR circuit having two input terminals each of which coupled to the data signal line "d0" and "d1," respectively.

Further, the decoder 200 decodes the transmit data that has been encoded by the dual-rail encoding and input from the transmitter 10 through the data signal lines d0 and d1. If the decoded transmit data is the symbol I, the decoder 200 outputs a symbol I signal 'inv' at the H level, on the contrary, if the decoded transmit data is not the symbol I, the decoder 200 outputs the symbol I signal 'inv' at the L level to the data invalid signal generator 202, the receiving completion detector 205, and the receiving completion reporter 206 through a symbol I signal line.

The decoder 200 generates the symbol I signal on 'inv' simply by an and-logic (AND) circuit having two input terminals coupled to the data signal line "d0" and "d1," respectively.

Further, the decoder 200 decodes the transmit data that has been encoded by the dual-rail encoding and input from the transmitter 10 through the data signal lines d0 and d1. If the decoded transmit data is the symbol N, the decoder 200 outputs a symbol N signal 'null' at the H level, on the contrary, if the decoded transmit data is not the symbol N, the decoder 200 outputs the symbol N signal 'null' at the L level to the data invalid signal generator 202 through a symbol N signal line.

The decoder 200 generates the symbol N signal on 'null' by using a not-or logic (NOR) circuit having two input terminals coupled to the data signal line "d0" and "d1," respectively.

The data invalid signal generator 202 receives the symbol l signal 'inv' and the symbol N signal 'null' from the decoder 200 and then drives a data invalid signal 'datadis' to the H level (truth) for a period of time from receipt of the symbol l signal 'inv' to receipt of the symbol N signal 'null.' Further, the data invalid signal generator 202 outputs the data invalid signal on 'datadis' that has been generated to the strobe signal generator 203.

The strobe signal generator 203 receives the data invalid signal 'datadis' from the data invalid signal generator 202 while receiving the data receiving signal 'receive' from the decoder 200. Only when the data invalid signal 'datadis' is L level (false), the strobe signal generator 203 outputs the data receiving signal 'receive' being input to the FIFO 201 as a strobe signal 'strobe'.

The strobe signal generator 203 can include a not logic (NOT) circuit 231 and an-and logic (AND) circuit 232. The input to the NOT circuit 231 is the data invalid signal 'datadis' from the data invalid signal generator 202. The data invalid signal on 'datadis' is inversed by the NOT circuit 231 to gate the data receive signal on "receive" by the AND circuit 232. Further, the data receiving signal on 'receive' is fed by the decoder 200 to the other input terminal of the AND circuit 232. The strobe signal on 'strobe' outputted by the AND circuit 232 is fed to the FIFO 201.

The FIFO 201 receives and stores the receiving data on 'data2' outputted by the decoder 200 when the strobe signal on 'strobe' is active or "H." The FIFO 201 can store the receiving data on 'data2' from the decoder 200 when the strobe signal on 'strobe' is swung from the L level to the H level.

Further, corresponding to an input of the read signal 'read' from the receiver control bus 40, the FIFO 201 outputs the data stored in the memory inside to the receiver control bus 40 as the data 'data 3' in order that the data has been stored. Further, the FIFO 201 monitors the data amount stored inside. If the data amount stored inside reaches a certain rate that is preliminarily defined with respect to the data amount storable in the FIFO 201 or more, the FIFO 201 outputs the read request signal 'readreq' to the receiver control bus 40.

The receiving data counter 204 increments the number of pieces of the receiving data stored in the counter memory 210 corresponding to the strobe signal 'strobe' input from the strobe signal generator 203.

For example, corresponding to the input of the strobe signal 'strobe', the receiving data counter 204 reads the number of pieces of the receiving data stored in the receiving data counter 204. After incrementing the number of pieces of the receiving data being read by one, the receiving data counter 204 stores the number of pieces of the receiving data incremented in the receiving data counter 204. According to the above, the receiving data counter 204 increments the number of pieces of the receiving data stored in the transmit data counter 204 by updating the number of pieces of the receiving data stored therein.

After reading the number of pieces of the receiving data from the counter memory 210, and reading the number of pieces of the burst data from the data length memory 211, the receiving completion detector 205 detects whether the number of pieces of the receiving data and the number of pieces of the burst data correspond with each other. Further, in a case of detecting that the number of pieces of the receiving data and the number of pieces of the burst data correspond with each other, the receiving completion detector 205 outputs a receiving confirmation signal that is the confirmation signal line 'comp1' at the H level to the receiving completion reporter 206. Further, while outputting the confirmation signal line 'comp1' at the H level, the receiving completion detector 205 makes an output of the confirmation signal line 'comp1' be at the L level corresponding to the input of the symbol I signal 'inv' at the H level from the data invalid signal generator 202.

Corresponding to the input of the confirmation signal line 'comp1' at the H level from the receiving completion detector 205, the receiving completion reporter 206 transmits the receiving completion signal that is the confirmation signal line 'comp2' at the H level to the transmitter 10 through the confirmation signal line 'comp2'. Further, while transmitting the receiving completion signal that is the confirmation signal line 'comp2' at the H level, the receiving completion reporter 206 makes an output of the confirmation signal line 'comp2' be at the L level corresponding to the input of the symbol I signal 'inv' at the H level from the data invalid signal generator 202.

[Operation of the Transmitter 10]

Figure 6:
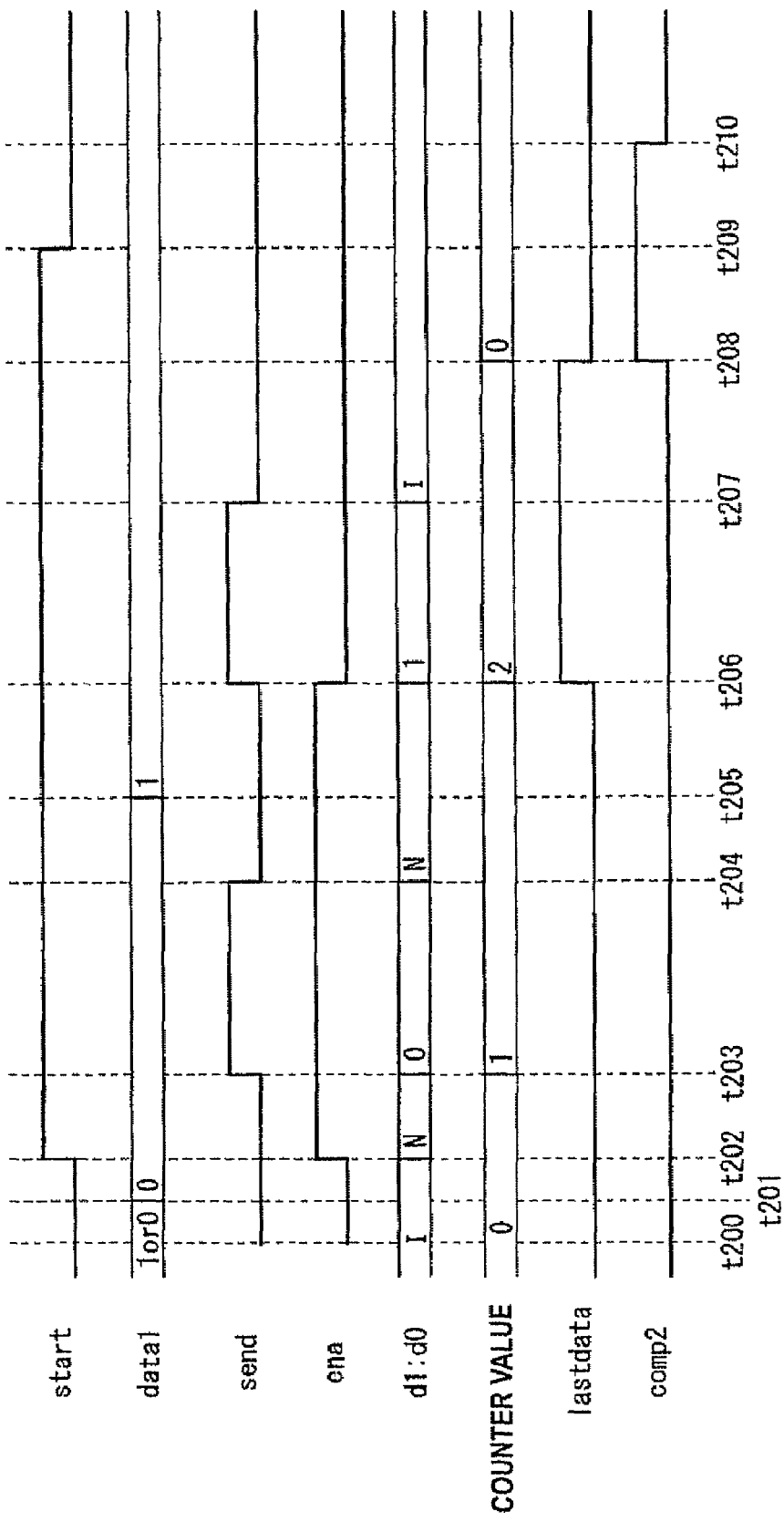
FIG. 6 is a timing chart indicating an operation of the transmitter according to the first embodiment.

Next, an operation of the transmitter 10 will be described with reference to FIG. 6.

First, at a timing $t_{200}$ before the burst transmission, the encoder 100 outputs the reception enable signal 'ena' at the L level to the transmission control bus 30. Further, the encoder 100 receives the transmit control signal 'send' at the L level and the burst communication start signal 'start' at the L level from the transmission control bus 30. The encoder 100 further receives the transmission data 'data1' at the H level (data1) or at the L level (data0) from the transmission control bus 30 depending on the burst transmission performed immediately before. Furthermore, the encoder 100 outputs the symbol I to the receiver 20 through the two data signal lines d0 and d1.

Next, at a timing $t_{201}$, the encoder 100 receives the data 0 as the transmission data 'data1' from the transmission control bus 30. Next, at a timing $t_{202}$, the encoder 100 receives the burst communication start signal 'start' at the H level from the transmission control bus 30. Corresponding to the input of the burst communication start signal 'start' at the H level at the timing $t_{202}$, the encoder 100 makes the reception enable signal 'ena' be at the H level and outputs the symbol N to the receiver 20.

Next, at a timing $t_{203}$, the encoder 100 receives the transmit control signal 'send' at the H level from the transmission control bus 30. Corresponding to the input of the transmit control signal 'send' at the H level at the timing $t_{203}$, the encoder 100 outputs the symbol 0 to the receiver 20, and outputs the transmit signal 'dsend' at the H level to the transmit data counter 104.

Further, corresponding to the input of the transmit signal 'dsend' from the encoder 100 at the timing $t_{203}$, the transmit data counter 104 increments the number of pieces of the transmit data stored in the transmit data counter 104. The number of pieces of the transmit data incremented is defined as 1.

Next, at a timing $t_{204}$, the encoder 100 receives the transmit control signal 'send' at the L level from the transmission control bus 30. Corresponding to the input of the transmit control signal 'send' at the L level at the timing $t_{204}$, the encoder 100 outputs the symbol N to the receiver 20, and makes the transmit signal 'dsend' be at the L level. Next, at a timing $t_{205}$, the encoder 100 receives the data 1 as the transmission data 'data1' from the transmission control bus 30. Then, at a timing $t_{206}$, the encoder 100 receives the transmit control signal 'send' at the H level from the transmission control bus 30. Corresponding to the input of the transmit control signal 'send' at the H level at the timing $t_{206}$, the encoder 100 outputs the symbol 1 to the receiver 20, and outputs the transmit signal 'dsend' at the H level to the transmit data counter 104.

Further, corresponding to the input of the transmit signal 'dsend' from the encoder 100 at the timing $t_{206}$, the transmit data counter 104 increments the number of pieces of the transmit data stored in the transmit data counter 104. The number of pieces of the transmit data increased is defined as 2.

Furthermore, corresponding to that the number of pieces of the transmit data stored in the transmit data counter 104 is 2 at the timing t2136, the last data detector 105 outputs the last data signal 'lastdata' at the H level to the encoder 100. Corresponding to the input of the last data signal 'lastdata' at the H level at the timing $t_{206}$, the encoder 100 outputs the reception enable signal 'ena' at the L level to the transmission control bus 30.

Next, at a timing $t_{207}$, the encoder 100 receives the transmit control signal 'send' at the L level from the transmission control bus 30. Corresponding to the input of the transmit control signal 'send' at the L level and the last data signal 'lastdata' at the H level at the timing $t_{207}$, the encoder 100 outputs the symbol I to the receiver 20. Further, corresponding to the input of the transmit control signal 'send' at the L level at the timing $t_{207}$, the encoder 100 makes the transmit signal 'dsend' be at the L level.

Next, at a timing $t_{208}$, the initial setting unit 101 receives the confirmation signal line 'comp2' at the H level from the receiver 20. Next, at the timing $t_{208}$, corresponding to the reception of the confirmation signal line 'comp2' at the H level from the receiver 20, the initial setting unit 101 outputs the confirmation signal line 'comp3' at the H level to the transmission control bus 30. Further, at the timing $t_{208}$, corresponding to the reception of the confirmation signal line 'comp2' at the H level from the receiver 20, the last data detector 105 makes the last data signal 'lastdata' be at the L level.

Next, corresponding to that the initial setting unit 101 outputs the confirmation signal line 'comp3' at the H level to the transmission control bus 30 at the timing $t_{208}$, the encoder 100 receives the burst communication start signal 'start' at the L level from the transmission control bus 30 at a timing $t_{209}$.

Next, at a timing $t_{210}$, the initial setting unit 101 receives the confirmation signal line 'comp2' at the L level from the receiver 20. At the timing tam, corresponding to the reception of the confirmation signal line 'comp2' at the L level from the receiver 20, the initial setting unit 101 outputs the confirmation signal line 'comp3' at the L level to the transmission control bus 30.

[Operation of the Receiver 20]

Figure 7:
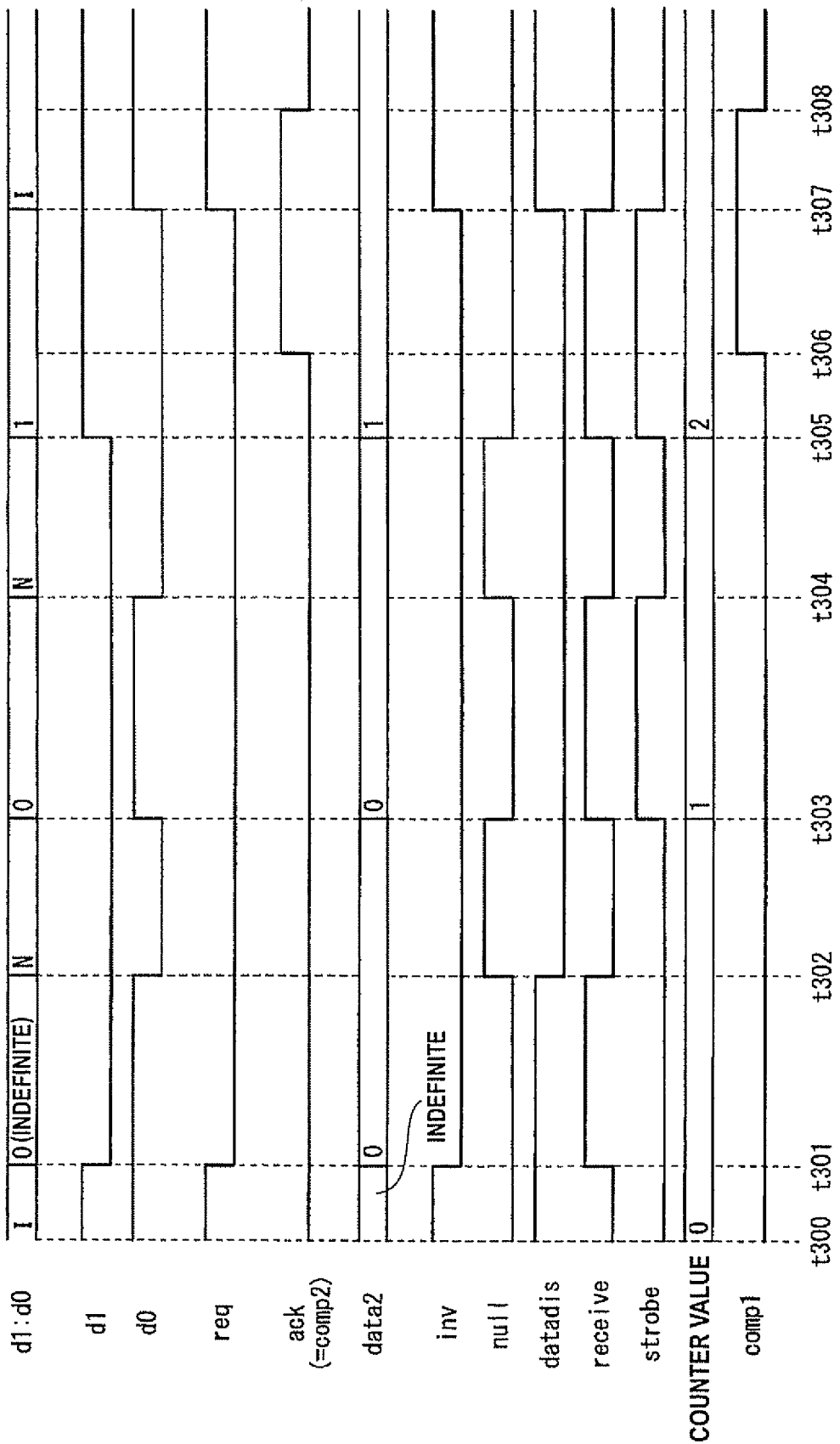
FIG. 7 is a timing chart indicating an operation of the receiver according to the first embodiment.

Next, an operation of the receiver 20 will be described with reference to FIG. 7.

First, at a timing $t_{300}$ before communication starts, the receiver 20 receives both the data signal lines d0 and d1 at the H level. That is, the receiver 20 receives the symbol I from the transmitter 10 through the data signal lines d0 and d1.

At the timing $t_{300}$, the symbol I signal 'inv' output from the decoder 200 is at the H level. Further, the symbol N signal 'null' output from the decoder 200 is at the L level. Further, the receiving signal 'receive' output from the decoder 200 is at the L level. Further, the data invalid signal 'datadis' output from the data invalid signal generator 202 is at the H level. Further, the strobe signal 'strobe' output from the strobe signal generator 203 is at the L level. Further, the number of pieces of the receiving data stored in the counter memory 210 is 0.

Next, at a timing $t_{301}$, the decoder 200 receives the symbol 0. The symbol 0 is a hazard and indefinite. At the timing $t_{301}$, corresponding to the reception of the symbol 0, the decoder 200 makes the symbol I signal 'inv' be at the L level and makes the data receiving signal 'receive' be at the H level so as to output the data 0 as the receiving data 'data2'.

At the timing $t_{301}$, because the data invalid signal 'datadis' output from the data invalid signal generator 202 is at the H level, the decoder 200 makes the data receiving signal 'receive' be at the H level. However, the strobe signal 'strobe' output from the strobe signal generator 203 is maintained to be at the L level. Therefore, data is not written in the FIFO 201, and further the receiving data counter 204 does not count up the number of pieces of the receiving data stored in the counter memory 210. That is, the strobe signal generator 203 can mask the data receiving signal 'receive' at the H level output from the decoder 200 by the data invalid signal 'datadis' output from the data invalid signal generator 202 corresponding to indefinite receiving data caused by a hazard.

Next, at a timing $t_{302}$, the decoder 200 receives the symbol N. At the timing $t_{302}$, the decoder 200 makes the symbol N signal 'null' be at the H level and makes the data receiving signal 'receive' be at the L level corresponding to the reception of the Symbol N. Further, corresponding to that the symbol N signal 'null' is at the H level, the data invalid signal generator 202 makes the data invalid signal 'datadis' to be at the L level.

Next, at a timing $t_{303}$, the decoder 200 receives the symbol 0. At the timing $t_{303}$, corresponding to the reception of the symbol 0, the decoder 200 makes the symbol N signal 'null' be at the L level and makes the data receiving signal 'receive' be at the H level so as to output the data 0 as the receiving data 'data2'.

At the timing $t_{303}$, because the data invalid signal 'datadis' output from the data invalid signal generator 202 is at the L level, corresponding to that the data receiving signal 'receive' is at the H level, the strobe signal generator 203 makes the strobe signal be at the H level.

Further, at the timing $t_{303}$, corresponding to that the strobe signal 'strobe' becomes at the H level, the FIFO 201 stores the data 0 input as the receiving data 'data2'. Further, the receiving data counter 204 increments the number of pieces of the receiving data stored in the counter memory 210. The number of pieces of the receiving data incremented is defined as 1.

Next, at a timing $t_{304}$, the decoder 200 receives the symbol N. Then, at a timing $t_{305}$, the decoder 200 receives the symbol 1. Operations of the decoder 200, the strobe signal generator 203, the FIFO 201, and the receiving data counter 204 at the timing $t_{304}$ and the timing $t_{305}$, are the same as those at the timing $t_{302}$ and the timing $t_{303}$.

However, at the timing $t_{305}$, the data that the FIFO 201 stores is the data 1 and the number of pieces of the receiving data stored in the counter memory 210 is 2 unlike the timing $t_{302}$ and the timing $t_{303}$. Further, unlike the timing $t_{302}$ and the timing $t_{303}$, the data invalid signal 'datadis' output from the data invalid signal generator 202 is maintained in the L level.

Next, corresponding to that the number of pieces of the receiving data stored in the counter memory 210 becomes 2 at the timing $t_{305}$, the receiving completion detector 205 makes the confirmation signal line 'comp1' be at the H level. Corresponding to that the confirmation signal line 'comp1' becomes at the H level at the timing $t_{305}$, the receiving completion reporter 206 transmits the acknowledged signal 'ack' that is the confirmation signal line 'comp2' at the H level to the transmitter 10 through the confirmation signal line 'comp2'.

Next, at a timing $t_{307}$, the decoder 200 receives the symbol I. At the timing $t_{307}$, the decoder 200 makes the symbol I signal 'inv' be at the H level and makes the data receiving signal 'receive' be at the L level corresponding to the reception of the symbol I. Further, at the timing 307, corresponding to that the symbol I signal 'inv' is at the H level, the data invalid signal generator 202 makes the data invalid signal 'datadis' be at the H level. Further, at the timing $t_{307}$, corresponding to that the data receiving signal 'receive' becomes the L level, or the data invalid signal 'datadis' becomes the H level, the strobe signal generator 203 makes the strobe signal be at the L level.

Next, corresponding to that the symbol I signal 'inv' is at the H level at the timing $t_{307}$, the receiving completion detector 205 makes the confirmation signal 'comp1' be at the L level, while the receiving completion reporter 206 makes the confirmation signal 'comp2' be at the L level.

Second Embodiment

Serial-to-Parallel Conversion Added to First Embodiment

Figure 8:
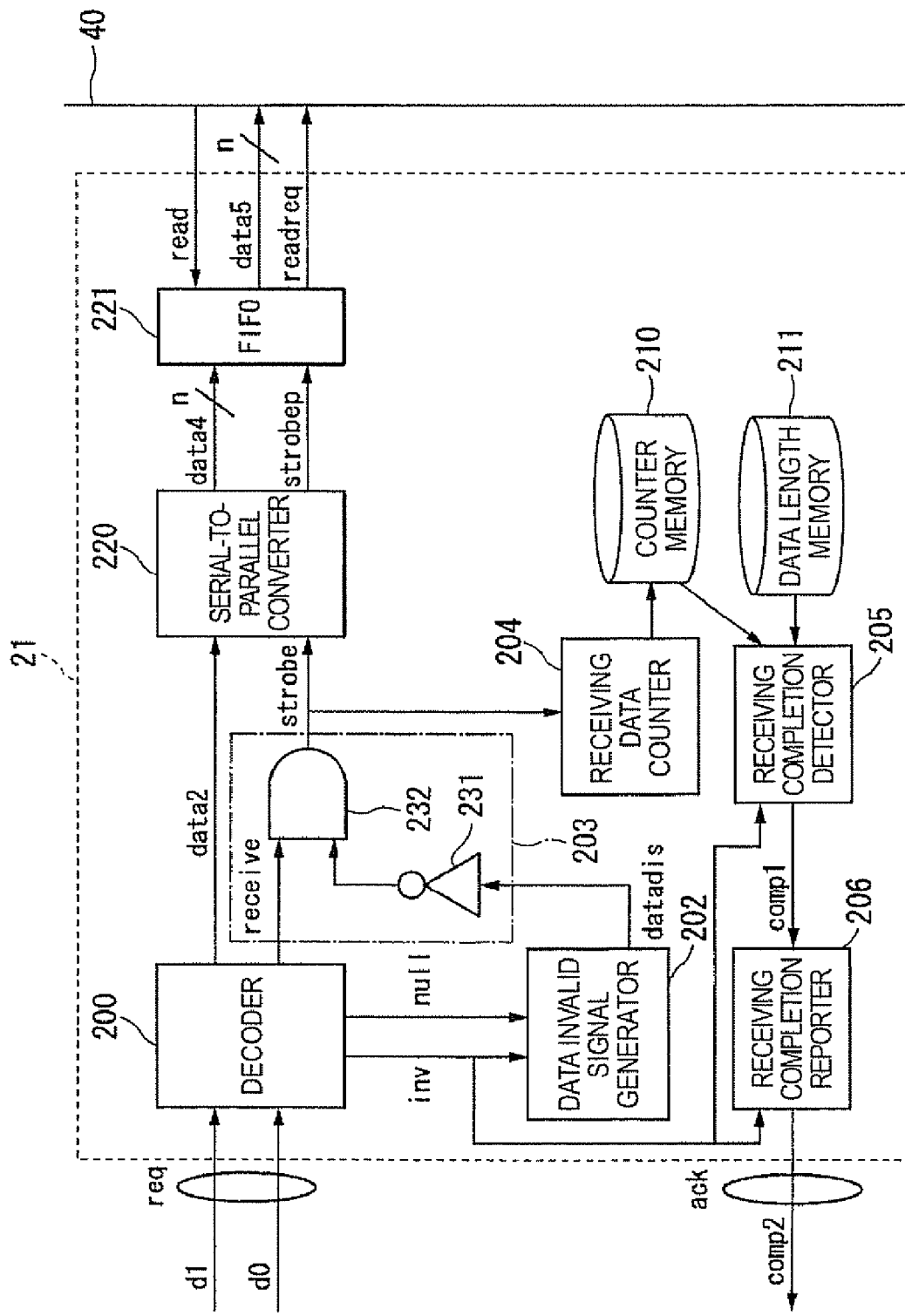
FIG. 8 is a block diagram schematically illustrating the configuration of the receiver according to the second embodiment.

Next, a configuration of a receiver 21 that is a high bit-rate serial data transmission system according to a second embodiment of the invention is described below with reference to FIG. 8. In FIG. 8, parts which correspond to those of FIG. 5 are indexed with the same numbers and the description thereof is left out.

In the high bit-rate serial data transmission system according to the first embodiment, the receiver 20 stores serial data and outputs the stored serial data in serial form to the receiver control bus 40. Unlike the high bit-rate serial data transmission system according to the first embodiment, the high bit-rate serial data transmission system according to the second embodiment has a means of parallel data handling by the receiver 21 instead of the receiver 20 of the first embodiment which stores parallel data and enables output of the stored parallel data to the receiver control bus 40.

In the receiver 21 according to the second embodiment shown in FIG. 8, the FIFO 201 of the receiver 20 according to the first embodiment in FIG. 5 is replaced with the FIFO 221.

The FIFO 201 according to the first embodiment stores and outputs 1-bit data in the first-in-first-our order. On the other hand, the FIFO 221 according to the second embodiment stores and outputs plural-but parallel in the first-in-first-out order.

The single data line 'data3' connected to the FIFO 201 in the first embodiment is replaced with the parallel data lines 'data5' connected to the FIFO 221. 'Data3' is a single data line, while 'data5' is a set of n-bit parallel data lines.

The receiver 21 according to the second embodiment shown in FIG. 8 is formed by adding a serial-to-parallel converter 220 between the decoder 200 and the FIFO 201.

The serial-to-parallel converter 220 converts the serial data on 'data2' which is outputted by the decoder 200 into n-bit parallel data 'data4' and outputs the converted parallel data to 'data4'.

For example, the serial-to-parallel converter 220 receives the serial data on 'data2' from the decoder 200 and receives the strobe signal on 'strobe' from the strobe signal generator 203. Corresponding to the input of the strobe signal on 'strobe', the serial-to-parallel converter 220 converts the serial data on 'data2' input into the parallel data of a given number of bits, and outputs the parallel data onto 'data4' connecting to the FIFO 221. Further, the serial-to-parallel converter 220 outputs a strobe signal via 'strobep' to the FIFO 221 corresponding to the input of the strobe signal on 'strobe'.

The FIFO 221 receives the parallel data 'data4' and the strobe signal 'strobep' from the serial-to-parallel converter 220 and stores the parallel data 'data4' by using the strobe signal on 'strobep'.

Further, corresponding to the read signal 'read' fed via the receiver control bus 40, the FIFO 201 outputs the n-but parallel datavia 'data 5' to the receiver control bus 40.

As the above, in comparison to the high bit-rate serial data transmission system according to the first embodiment, the high bit-rate serial data transmission system according to the second embodiment can store the data by using the n-bit serial-to-parallel converter 220 and the n-bit parallel FIFO 221.

Further, the high bit-rate serial data transmission system according to the second embodiment enables the data stored in the n-bit parallel FIFO 221 to be outputted via the receiver control bus 40 or the receiver control bus master coupled to the receiver control bus 40.

Third Embodiment

Employing a Function Enabling Variable Burst Transmission and Reception to the First and Second Embodiments Next, a high-bit-rate serial data transmission system according to a third embodiment of the invention will be described.

In the high bit-rate serial data transmission system according to the first embodiment, the burst data length is preliminarily determined between the transmitter 10 and the receiver 20. That is, the high-bit-rate serial data transmission system in the first embodiment is for transmission of burst data having a fixed length. On the other hand, the high-bit-rate serial data transmission system according to the second embodiment enables variable burst transmission and reception.

Unlike the high bit-rate serial data transmission system according to the first embodiment, the high bit-rate serial data transmission system according to the second embodiment is, firstly, made to include burst length setting information that is information of the number of pieces of the burst data into transmit data of burst communication.

Next, the transmitter 10 and the receiver 20 extract the burst length setting information included in the transmit data. Based on the extracted data, the number of pieces of the burst data for the data length memory 111 and the data length memory 211 is set, enabling variable burst transmission and reception.

First, two methods for including the burst length setting information into the transmit data of the burst communication will be explained with reference to FIGS. 11A and 11B.

In a first method for including the burst length setting information into the transmit data shown in FIG. 11A, the burst length setting information is included in a head of the transmit data as fixed length header information.

In FIG. 11A, the burst length setting information is included as the fixed length header information that is the i-number of pieces of transmit data in the head of the transmit data.

In a second method for including the burst length setting information into the transmit data shown in FIG. 11B, first, the burst length setting information is transmitted as the transmit data at the start of communication. Here, the burst length setting information is transmitted by the k-number of pieces of transmit data. Then, the transmit data is transmitted and received at the burst data length set to the burst length setting information.

Figure 9:
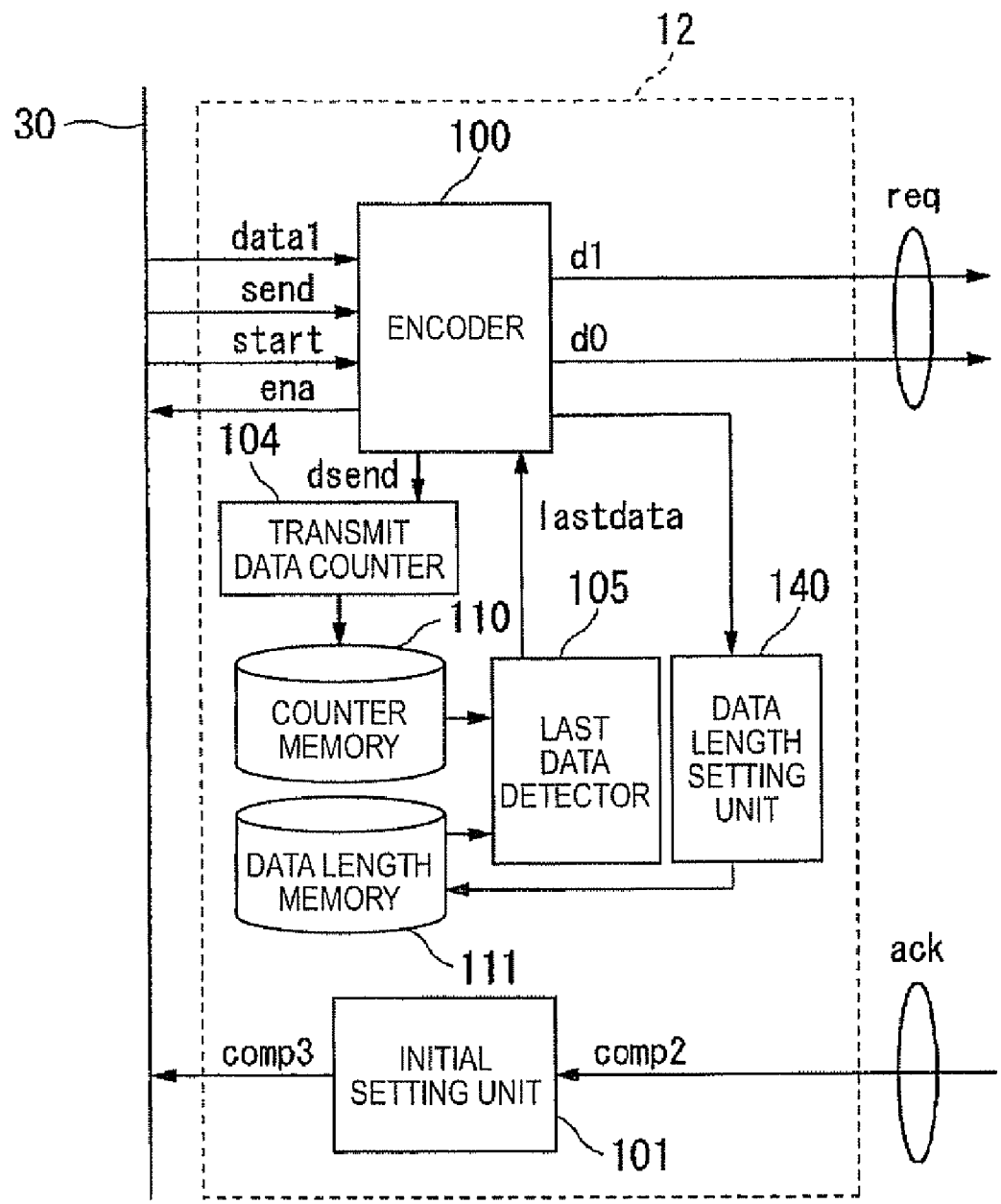
FIG. 9 is a block diagram schematically illustrating a configuration of the transmitter according to the third embodiment.

Next, a configuration of a transmitter 12 according to the third embodiment will be described with reference to FIG. 9. In FIG. 9, parts which correspond to those of FIG. 4 will be denoted with the same reference numerals and the description thereof will be omitted.

The transmitter 12 according to the third embodiment shown in FIG. 9 is formed by adding a data length setting unit 140 to the transmitter 10 according to the first embodiment in FIG. 4.

The data length setting unit 140 extracts the burst length setting information from the transmit data to be transmitted, and writes the extracted information in the data length memory 111, so that the burst length setting information having been extracted is set.

Figure 10:
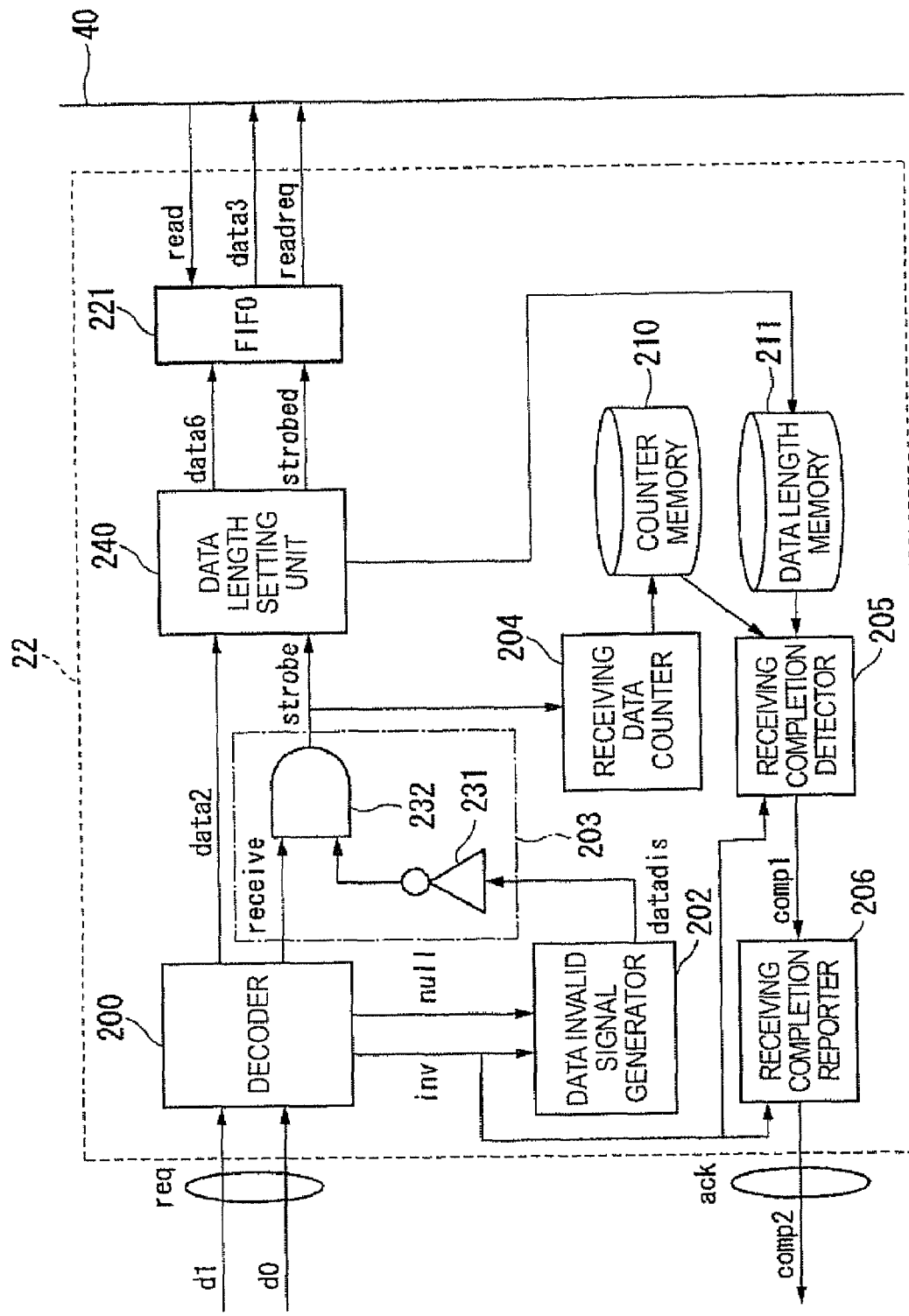
FIG. 10 is a block diagram schematically illustrating the configuration of the receiver according to the third embodiment.

Next, a configuration of a receiver 22 according to the third embodiment will be described with reference to FIG. 10. In FIG. 10, parts which correspond to those of FIG. 5 will be denoted with the same reference numerals and the description thereof will be omitted.

The receiver 22 according to the third embodiment shown in FIG. 10 is formed by adding a data length setting unit 240 to the receiver 20 according to the first embodiment in FIG. 5.

The data length setting unit 240 extracts the burst length setting information from receiving data having been received, and writes the extracted information in the data length memory 211, so that the burst length setting information being extracted is set.

Here, although information of the number of pieces of the burst data is included in the transmit data as the burst length setting information in the above, an index indicating a burst data length may be included instead of the information indicating a value of the burst data length in the transmit data.

For example, as shown in FIG. 12, a burst data length index that is an index indicating a burst data length and burst data length information are associated with each other in each of the transmitter 12 and the receiver 22, forming a burst data length corresponding table. The table is preliminarily stored in a burst data length corresponding table memory.

Next, each of the data length setting unit 140 and the data length setting unit 240 extracts the burst data length index included in the transmit data described above, and reads a burst data length corresponding to the extracted index from the burst data length corresponding table included in each of the data length setting unit 140 and the data length setting unit 240.

Then, the data length setting unit 140 and the data length setting unit 240 write the burst data lengths having been read in the data length memories 111 and 211 respectively.

This enables the burst data length index to be transmitted alone by using the burst data length corresponding table. Therefore, the burst data length information is transmitted by using the smaller number of pieces of the data than that of the burst data length information itself.

As described above, compared to the high bit-rate serial data transmission system according to the first embodiment, in the high bit-rate serial data transmission system according to the third embodiment, the transmitter 12 includes the data length setting unit 140, and the receiver 22 includes the data length setting unit 240 so that the burst length setting information is included in the transmit data, achieving variable burst transmission and reception between the transmitter 12 and the receiver 22.

The third embodiment described above is applicable not only to the first embodiment, but also applicable to the second embodiment in a similar way.

Fourth Embodiment

Passive Send-Active Receive

Figure 13:
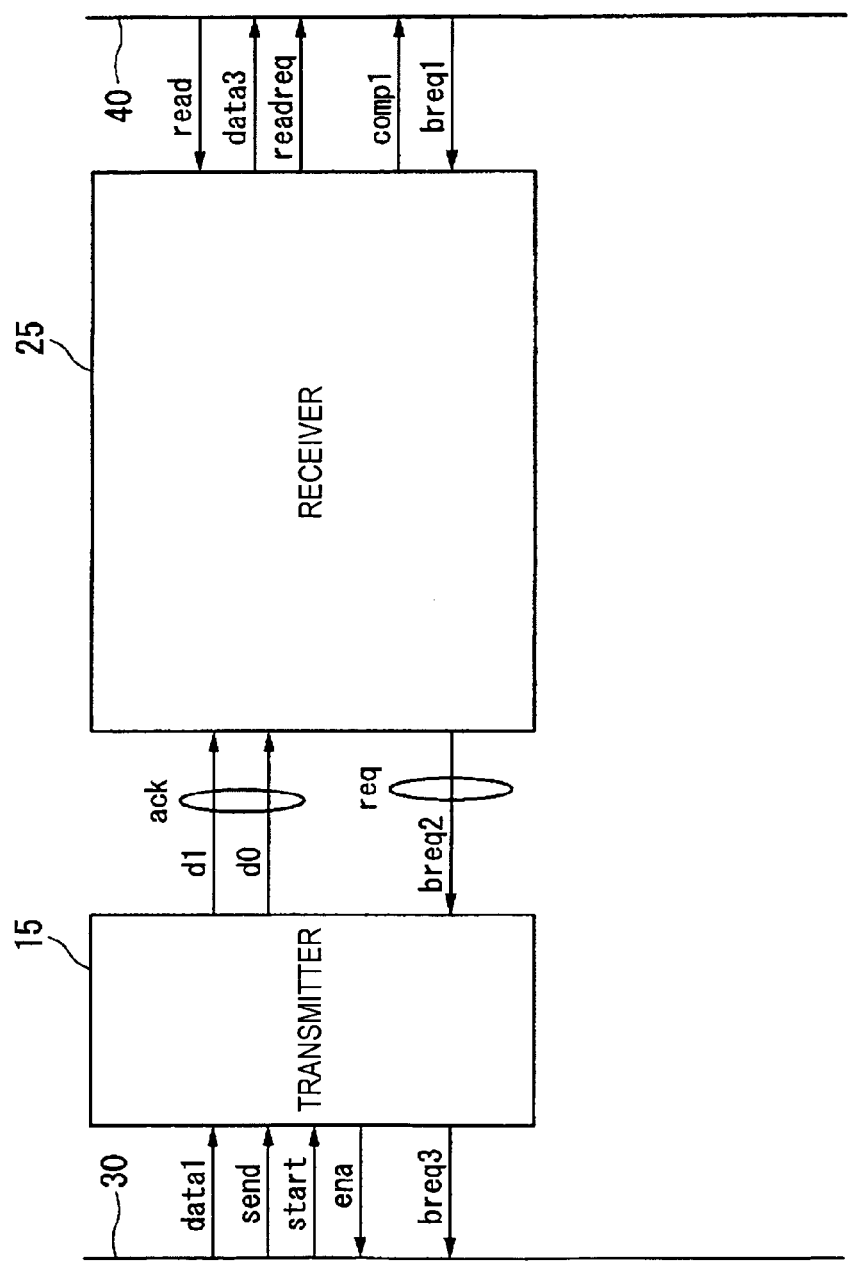
FIG. 13 is a block diagram schematically illustrating the configuration of the high-bit-rate serial data transmission system according to the fourth embodiment of the invention.

FIG. 13 is a block diagram schematically illustrating a configuration of a high bit-rate serial data transmission system according to a fourth embodiment of the invention. While the high bit-rate serial data transmission system in a case of active sending-passive receiving is described in the first embodiment, the high bit-rate serial data transmission system according to the fourth embodiment is a combination of a passive transmitter and an active receiver. In FIG. 13, parts which correspond to those of FIG. 1 are indexed by using the same numbers and the description thereof is left out.

Instead of the confirmation signal line 'comp2' coupling the transmitter 10 and the receiver 20 in FIG. 1, a burst request signal line 'breq2' couples a transmitter 15 and a receiver 25 in FIG. 13.

Further, instead of the confirmation signal line 'comp3' coupling the transmitter 10 and the transmission control bus 30 in FIG. 1, a burst request signal line 'breq3' couples the transmitter 15 and the transmission control bus 30 in FIG. 13. The receiver 25 and the receiver control bus 40 in FIG. 13 are further coupled by a burst request signal line 'breq1' and the confirmation signal line 'comp1'.

In the high bit-rate serial data transmission system according to the first embodiment shown in FIG. 1, the transmitter 10 sends out the request signal to the receiver 20 through the data signal lines d0 and d1. Then, corresponding to that the receiver 20 receives the request signal, the high bit-rate serial data transmission system outputs the acknowledged signal 'ack' that is the confirmation signal line 'comp2' at the H level to the transmitter 10 through the confirmation signal line 'comp2'. That is, in the first embodiment, the transmitter 10 actively starts the communication for the burst serial transmission.

On the other hand, in the high bit-rate serial data transmission system according to the fourth embodiment shown in FIG. 13, corresponding to that the receiver 25 receives a burst request signal from the receiver control bus 40 through the burst request signal line 'breq1', the receiver 25 transmits the burst request signal to the transmitter 15 as the burst request signal line 'breq2' at the H level. Next, corresponding to the reception of the burst request signal that is the burst request signal line 'breq2' at the H level, the transmitter 15 transmits the acknowledged signal 'ack' to the receiver 25 through the data signal lines d0 and d1.

The acknowledged signal 'ack' is the first symbol N right after the last symbol I transmitted via the data signal lines d0 and d1.

As the above, in the high bit-rate serial data transmission system according to the fourth embodiment, the receiver 25 actively starts the communication.

[Operation of Transmitter 15 and Receiver 25]

Figure 14:
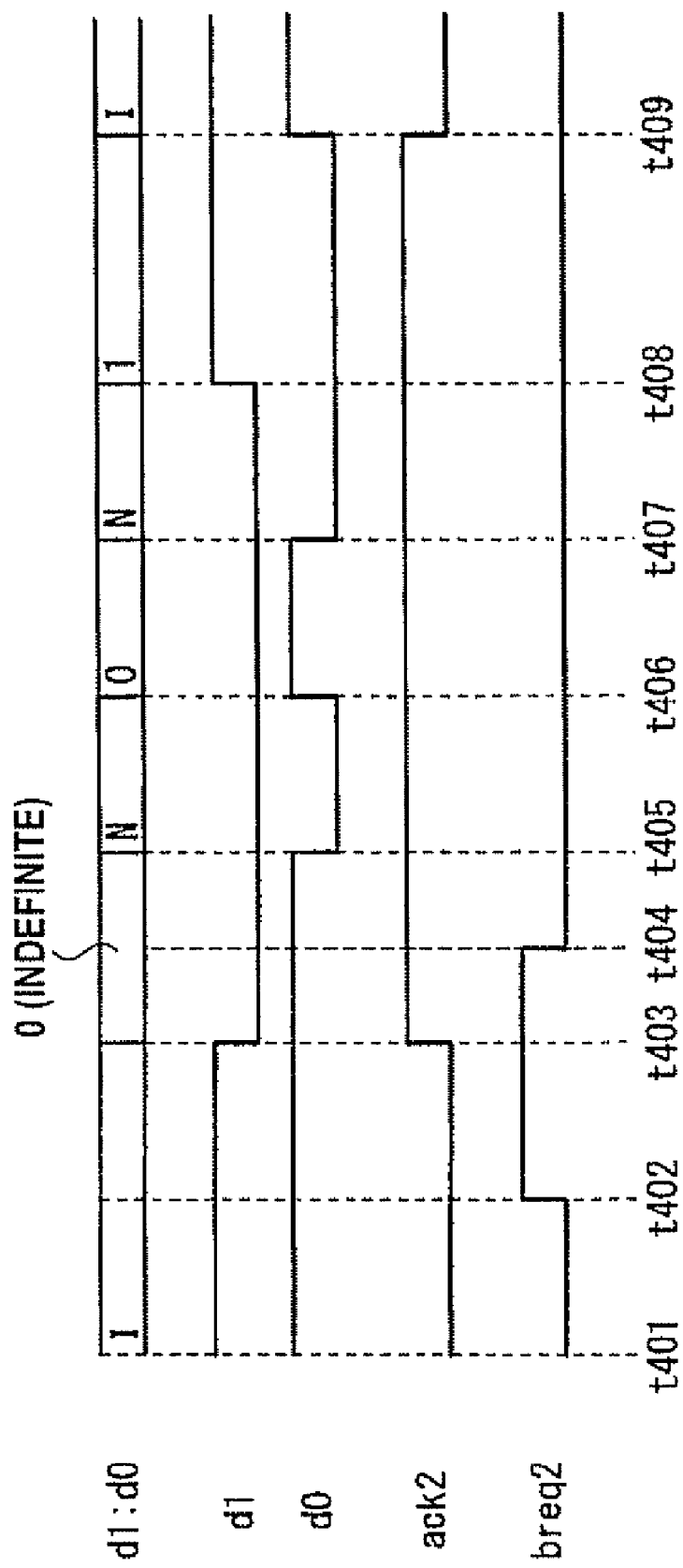
FIG. 14 is a timing chart indicating an operation of the high-speed serial data transmission system according to the fourth embodiment.

Next, referring to FIG. 14, an outline operation of transmission and reception of the transmitter 15 and the receiver 25 through the burst request signal line 'breq2', the two data signal lines d0 and d1 will be explained.

Here, a case of burst transmission of the transmitter 15 transmitting the two transmission datas, "data 0" and "data 1," will be described. That is, a case where the number of pieces of the burst data between the transmitter 15 and the receiver 25 is 2 will be explained.

First, at a timing $t_{401}$ that is before transmission, the transmitter 15 transmits the symbol I.

Next, corresponding to the reception of the burst request signal through the burst request signal line 'breq1' from the receiver control bus 40 at a timing $t_{402}$, the receiver 25 transmits the burst request signal as the burst request signal line 'breq2' at the H level to the transmitter 15.

Next, corresponding to the reception of the burst request signal through the burst request signal line 'breq2', the transmitter 15 outputs the burst request signal that is the burst request signal line 'breq3' at the H level to the transmission control bus 30 through the burst request signal line 'breq3'.

Next, the transmission control bus master coupled to the transmission control bus 30 starts burst transmission corresponding to the reception of the burst request signal.

Corresponding to that the transmission control bus master starts the burst transmission, the transmitter 15 starts transmitting transmit data at a timing $t_{403}$, and outputs the symbol N at a timing $t_{405}$. A signal output from the transmitter 15 between the timing $t_{403}$ and the timing $t_{405}$ is a hazard. In general, during the period between the time $t_{403}$ and the time $t_{405}$, there is a possibility to output the symbol 0 or the symbol 1, therefore, it is indefinite. Here, the explanation will be given in a case of the symbol 0 between the time $t_{403}$ and the time $t_{405}$.

Corresponding to the reception of the symbol 0 that is other than the symbol I at the timing $t_{403}$, the receiver 25 makes the burst request signal line 'breq2' be at the L level at a timing $t_{404}$. Corresponding to the reception of the symbol 0 that is other than the symbol I at the timing $t_{403}$, the receiver 25 detects that the transmitter 15 has started burst transmission corresponding to the burst request signal.

Next, the transmitter 15 transmits the symbol 0 at a timing $t_{406}$. The receiver 25 receives the symbol 0 as the transmit data symbol, and counts the transmit data symbol, defining the number of pieces of receiving data as 1. Next, the transmitter 15 transmits the symbol N at a timing $t_{407}$, and transmits the symbol 1 at a timing $t_{408}$.

The receiver 25 receives the symbol 1 as the transmit data symbol at the timing $t_{408}$ and counts the transmit data symbol that is received, defining the number of pieces of receiving data as 2. By detecting that the number of pieces of the receiving data is 2, the receiver 25 detects that the burst transmission has terminated.

Since the transmitter 15 also counts the transmit data, the transmitter 15 also outputs the symbol I at a timing $t_{409}$ upon detecting that the number of pieces of the receiving data is 2.

Figure 15:
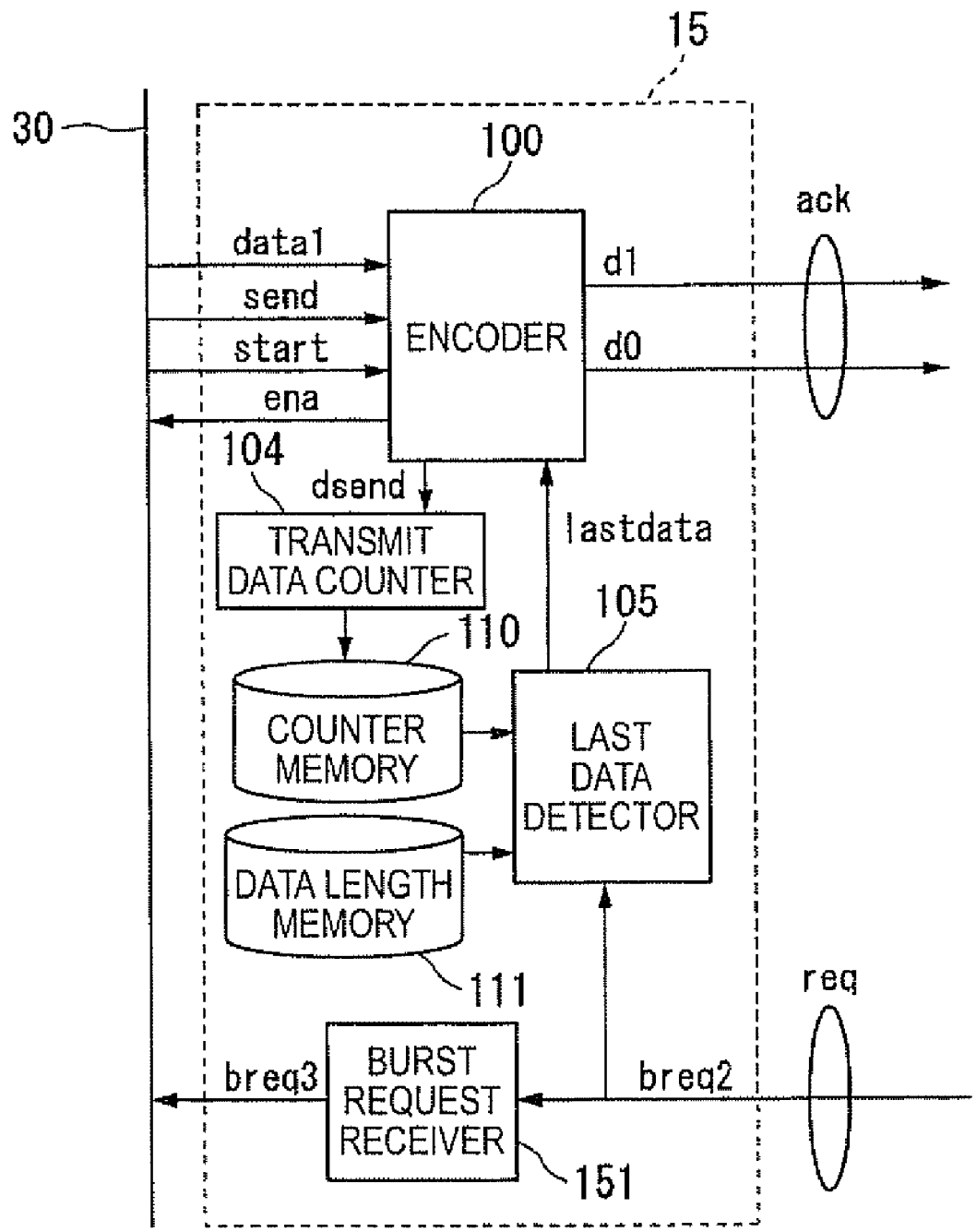
FIG. 15 is a block diagram schematically illustrating the configuration of the transmitter according to the fourth embodiment.

Next, a configuration of the transmitter 15 will be described with reference to FIG. 15. In FIG. 15, parts which correspond to those of FIG. 13 or FIG. 4 will be denoted with the same reference numerals and the description thereof will be omitted.

In FIG. 15, the initial setting unit 101 in FIG. 4 is changed to a burst request receiver 151.

The burst request receiver 151 receives the burst request signal from the receiver 25 through the burst request signal line 'breq2'.

Further, the burst request receiver 151 makes the received burst request signal be the burst request signal line 'breq2' at the H level so as to output the received burst request signal to the transmission control bus 30 through the burst request signal line 'breq2'.

Then, the transmission control bus master coupled to the transmission control bus 30 starts burst transmission upon receiving the burst request signal through the burst transmission control bus 30.

Next, a configuration of the receiver 25 will be described with reference to FIG. 15. In FIG. 15, parts which correspond to those of FIG. 13 or FIG. 5 will be denoted with the same reference numerals and the description thereof will be omitted.

Figure 16:
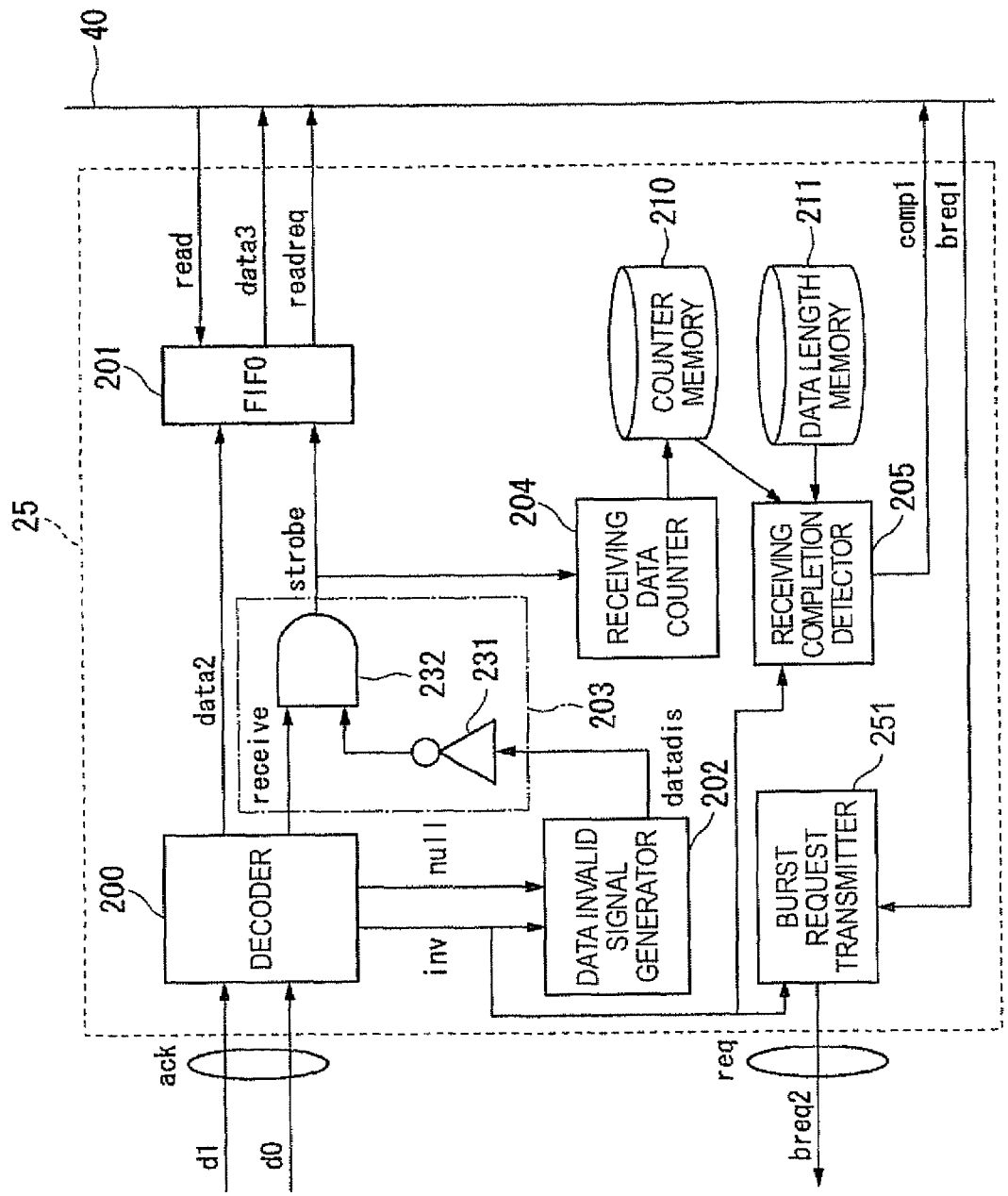
FIG. 16 is a block diagram schematically illustrating the configuration of the receiver according to the fourth embodiment.

In the fourth embodiment shown in FIG. 16, the receiving completion reporter 206 in the first embodiment shown in FIG. 5 is changed to a burst request transmitter 251.

Further, in the first embodiment shown in FIG. 5, the receiving completion detector 205 outputs the receiving confirmation signal that is the confirmation signal line 'comp1' at the H level to the receiving completion reporter 206 through the confirmation signal line 'comp1'. However, instead of this, in the fourth embodiment shown in FIG. 16, the receiving completion detector 205 outputs the receiving confirmation signal that is the confirmation signal line 'comp1' at the H level to the receiver control bus 40 through the confirmation signal line 'comp1'.

The burst request transmitter 251 receives the burst request signal from the receiver control bus 40 through the burst request signal line 'breq1'.

The burst request transmitter 251 transmits the burst request signal that has been input, to the transmitter 15 through the burst request signal line 'breq2'.

Further, corresponding to the input of the symbol I signal 'inv' at the H level from the decoder 200, the burst request transmitter 251 terminates the transmission of the burst request signal that is transmitted to the transmitter 15 through the burst request signal line 'breq2'.

Since the configuration and operation for the first embodiment and the fourth embodiment other than the above are the same, the description will be omitted.

Fifth Embodiment

Serial-to-Parallel Conversion Added to Fourth Embodiment

Figure 17:
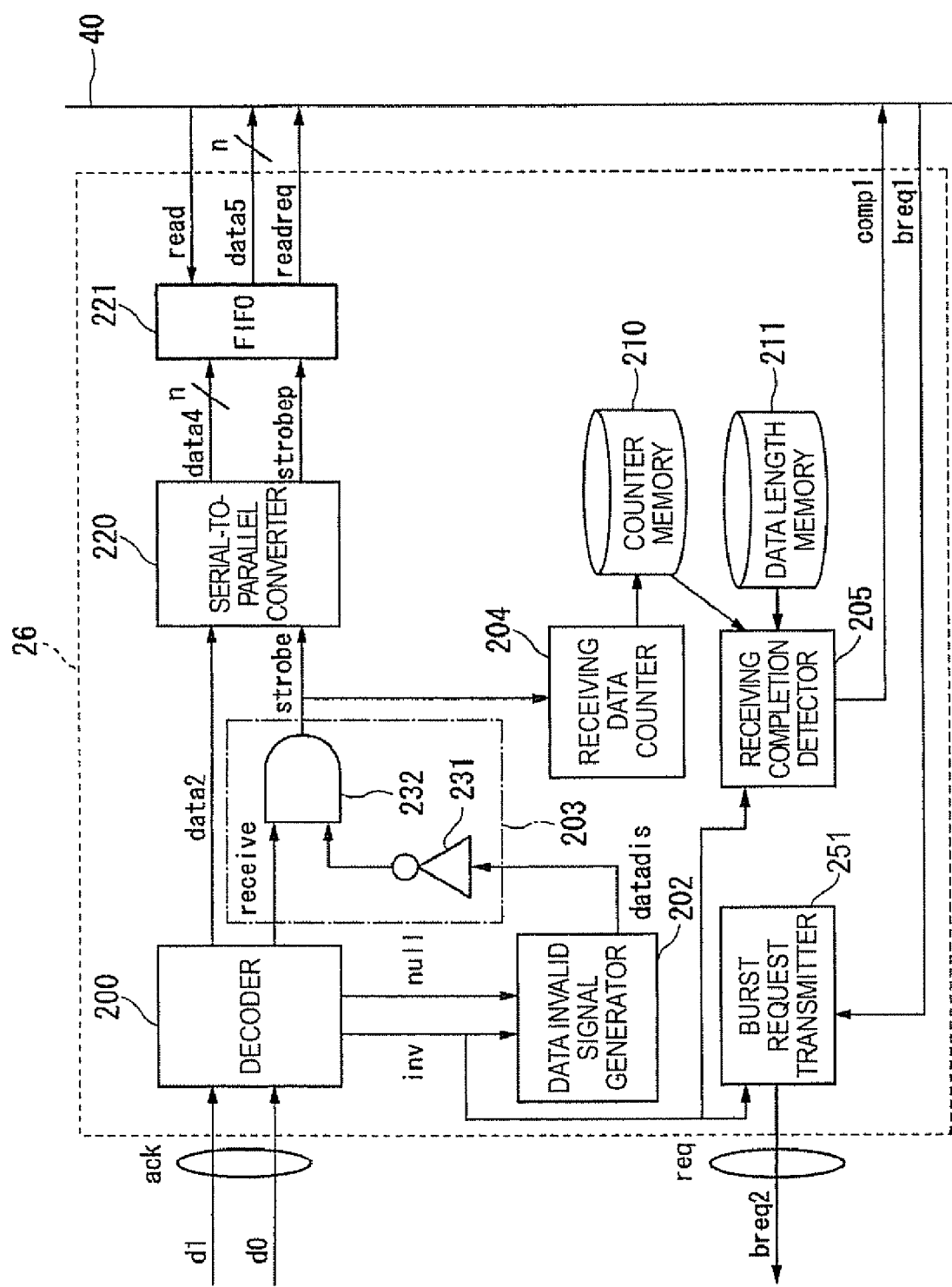
FIG. 17 is a block diagram schematically illustrating the configuration of the receiver according to the fifth embodiment.

Next, a configuration of a receiver 26 in a high bit-rate serial data transmission system according to a fifth embodiment of the invention is described in detail below with reference to FIG. 17. In FIG. 17, parts which correspond to those of FIG. 16 or FIG. 8 are indexed by using the same numbers and the description thereof is left out.

The receiver 26 according to the fifth embodiment is formed by adding a serial-to-parallel converter 220 between the decoder 200 and the FIFO 201 to the receiver 25 according to the fourth embodiment in FIG. 16 in a similar way to the receiver 21 according to the second embodiment shown in FIG. 8 with respect to the receiver 20 according to the first embodiment shown in FIG. 5.

Further, similarly to this, in the receiver 26 according to the fifth embodiment shown in FIG. 17, the FIFO 201 in the receiver 25 according to the fourth embodiment in FIG. 16 is changed to a FIFO 221.

Therefore, similarly to the second embodiment with respect to the first embodiment, compared to the high bit-rate serial data transmission system according to the fourth embodiment, the high bit-rate serial data transmission system according to the fifth embodiment the receiver 26 can handle the n-but parallel data by using the serial-to-parallel converter 220 and the FIFO 221, and by outputting the n-but parallel data via the receiver control bus 41 to the receiver control bus master.

Figure 18:
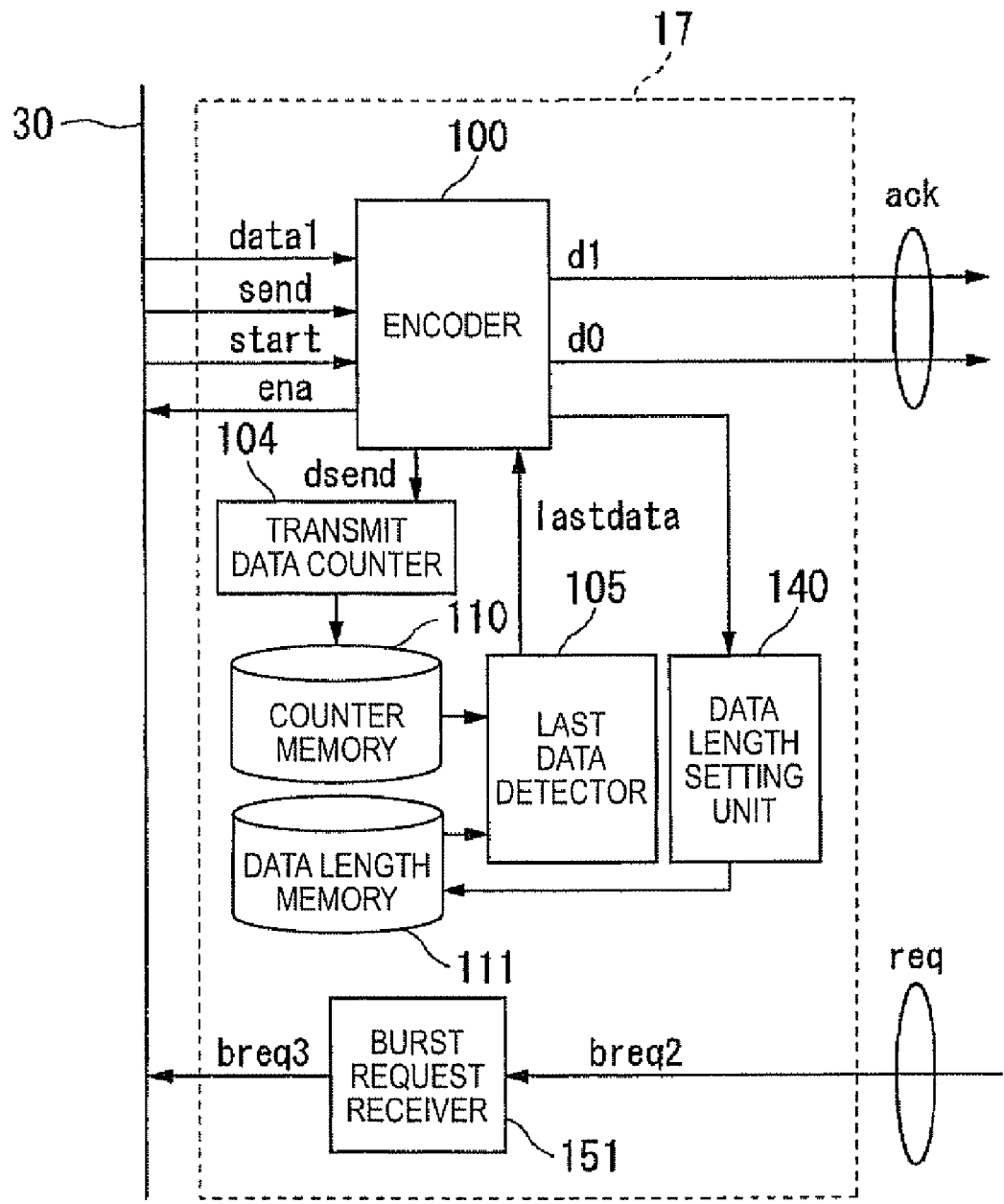
FIG. 18 is a block diagram schematically illustrating the configuration of the transmitter according to the sixth embodiment.
Figure 19:
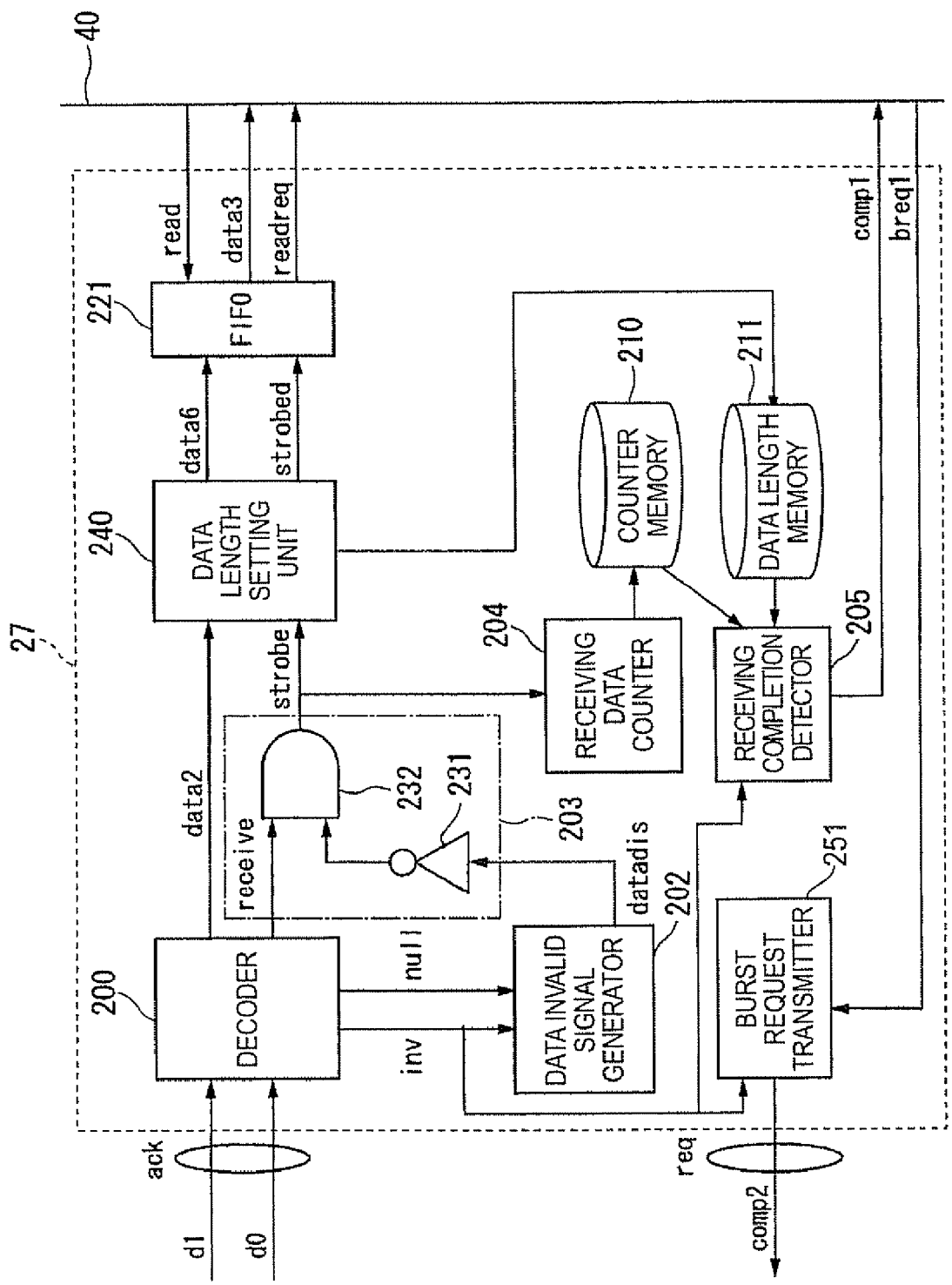
FIG. 19 is a block diagram schematically illustrating the configuration of the receiver according to the sixth embodiment.

Sixth Embodiment Enabling Variable Burst Transmission and Reception to the Fourth and Fifth Embodiments Next, configurations of a transmitter 17 and a receiver 27 in a high bit-rate serial data transmission system according to a sixth embodiment of the invention is described in detail below with reference to FIGS. 18 and 19. In FIGS. 18 and 19, parts which correspond to those of FIG. 15, 16, or 10 are indexed using the same numbers and the description thereof is left out.

The transmitter 17 according to the sixth embodiment shown in FIG. 18 is formed by adding the data length setting unit 140 to the transmitter 15 according to the fourth embodiment in FIG. 15 in a similar way to the receiver 12 according to the third embodiment shown in FIG. 9 with respect to the receiver 20 according to the first embodiment shown in FIG. 4.

Further, the receiver 27 according to the sixth embodiment shown in FIG. 19 is formed by adding the data length setting unit 240 to the receiver 25 according to the fourth embodiment in FIG. 16 in a similar way to the receiver 22 according to the third embodiment shown in FIG. 10 with respect to the receiver 20 according to the first embodiment shown in FIG. 5.

Therefore, similarly to the high bit-rate serial data transmission system according to the third embodiment being compared to the high bit-rate serial data transmission system according to the first embodiment, in the high bit-rate serial data transmission system according to the sixth embodiment, compared to the high bit-rate serial data transmission system according to the fourth embodiment, the transmitter 17 includes the data length setting unit 140 and the receiver 27 includes the data length setting unit 240 so that the burst length setting information is included in the transmit data, achieving variable burst transmission and reception between the transmitter 17 and the receiver 27.

The sixth embodiment described above is applicable not only to the fourth embodiment, but also applicable to the fifth embodiment in a similar way.

Further, in the first to sixth embodiments, a case of communication between the transmitter and the receiver by employing the four-way handshaking protocol has been described. However, the communication can be also achieved by the two-way handshaking protocol.

Further, in the first to sixth embodiments, only two bits of the burst serial transmission are used to simply explain the sequence of communication the transmitter and the receiver has been described. However, the invention is not limited to this, thereby burst transmission of transmit is rather unbounded.

In addition, in the first to sixth embodiments, it has been described that the data signal lines d0 and d1 are respectively made of metal lines. The data signal lines d0 and d1 can be replaced by optical fibers so as to achieve the same communication.

In this case of using optical fibers for the data signal lines, the encoder 100 includes a light emitter for each of the data signal lines: d0 and d1 that outputs optical signals corresponding to the symbols: a null symbol (symbol N), or an invalid symbol (symbol I), and data symbols representing the bit of data: 1 and 0 via the optical fibers and the decoder 200 includes a light receiver for each of the data signal lines: d0 and d1 that receives the optical signals of the symbols via the optic fibers.

Further, the light emitter performs high-frequency modulation on optical signals using a high-frequency wave in accordance with the data symbols. The light receiver receives and demodulates the high-frequency optical wave and then decodes the data in accordance with the symbols.

According to the above, when the high bit-rate serial data transmission system according to the first to sixth embodiments is communicated through the optic fiber, the high bit-rate serial data transmission system can communicate while reducing external influences such as electromagnetic waves from the environment.

Further, the high-bit-rate serial data transmission system according to the first to sixth embodiments may be fabricated on a single silicon. The circuit of the semiconductor device fabricated on a single silicon substrate can perform the high-bit-rate serial data transmission system.

Further, the high-bit-rate serial data transmission system according to the first to sixth embodiments may be fabricated on a plurality of silicon substrates to constitute a hybrid semiconductor device.

This enables communication of a circuit in a semiconductor device composed of various silicon substrates with the high-bit-rate serial data transmission system.

The counter memory 110, the data length memory 111, the counter memory 210, and the data length memory 211 include a nonvolatile memory such as a hard disk drive, an optical magnetic disk drive, and a flash memory; a storage medium that is read only such as a CR-ROM; and a volatile memory such as a random access memory (RAM), or combination of them.

Further, a transmitter such as the transmitter 10, 12, 15 or 17, and a receiver such as the receiver 20, 21, 22, 25, 26, or 27 may be respectively realized by a dedicated circuit, and also by a microprocessor and the peripheral circuits including memory devices.

In the above, although the embodiments of the invention have been described referring to the drawings, the concrete configurations and circuit designs not described here in the embodiments could be allowed as far as the scope and spirit of the invention is maintained.

The high-bit-rate serial data transmission system according to the invention is favorable for a communication device coupling various in-house manufacturing equipment.

Further, the high bit-rate serial data transmission system according to the invention is favorable for a communication device in a semiconductor device performing at a high bit-rate, with low power consumption that can bendable when such a flexible substrate such as plastic films is used.

What is claimed is:

1. A transmitter included in a fixed length serial burst data transmission system in which the transmitter and a receiver are coupled to each other through at least two data transmission lines, the transmitter comprising:
    a dual-rail encoder encoding fixed length serial transmit data having binary digits to transmit data symbols each predetermined to correspond to each piece of the transmit data, inserting an identification symbol between the encoded transmit data symbols so as to be encoded to identify the transmit data symbols one from another, and transmitting the encoded transmit data to the receiver through the two data transmission lines during transmission, while transmitting a non-transmission symbol indicating a non-transmission state to the receiver through the two data transmission lines during non-transmission.

2. The transmitter according to claim 1, further comprising:
    a transmit data counter counting a number of the transmit data symbols encoded and transmitted; and
    a last data detector detecting if a number of the transmit data counted by the transmit data counter is a predetermined number of data, and outputting a last data signal if the detected number of the transmit data is the predetermined number of data, wherein the dual-rail encoder transmits the non-transmission symbol to the receiver through the two data transmission lines corresponding to receiving the last data signal from the last data detector.

3. A transmitter included in a fixed length serial burst data transmission system in which the transmitter and a receiver are coupled to each other through at least two data transmission lines, the transmitter comprising:
    a burst request receiver receiving a burst transmission request signal from the receiver through a request signal line; and
    a dual-rail encoder encoding fixed length serial transmit data having binary digits to transmit data symbols each predetermined to correspond to each piece of the transmit data, inserting an identification symbol between the encoded transmit data symbols so as to be encoded to identify the transmit data symbols one from another, and transmitting the encoded transmit data to the receiver through the two data transmission lines during transmission, while transmitting a non-transmission symbol indicating a non-transmission state to the receiver through the two data transmission lines during non-transmission, corresponding to that the burst request receiver receives the burst transmission request signal.

4. A receiver included in a fixed length serial burst data transmission system in which a transmitter and the receiver are coupled to each other through at least two data transmission lines, the receiver comprising:
    a memory storing receiving data;
    a dual-rail decoder receiving fixed length serial transmit data from the transmitter, decoding encoded transmit data symbols based on an identification symbol included in the received fixed length serial transmit data, and storing the decoded fixed length serial transmit data in the memory as receiving data, the fixed length serial transmit data having binary digits to transmit data symbols each predetermined to correspond to each piece of the transmit data, having the identification symbol inserted between the encoded transmit data symbols so as to be encoded to identify the transmit data symbols one from another, and being output to the receiver through the two data transmission lines during transmission, while a non-transmission symbol indicating a non-transmission state is output to the receiver through the two data transmission lines during non-transmission;

a receiving data counter counting a number of pieces of the receiving data stored in the memory by the dual-rail decoder;

a detector detecting if the number of pieces of the receiving data counted by the receiving data counter is a predetermined number of pieces of data, and outputting a detection signal if the detected number of the pieces of the receiving data is the predetermined number of pieces of data; and a receiving completion reporter transmitting a receiving completion signal to the transmitter corresponding to receiving the detection signal from the detector.

5. The receiver according to claim 4, further comprising:

a data invalid signal generator outputting a data invalid signal for indicating that the receiving data is not stored from when a non-transmission symbol signal is input until when an identification symbol signal is input to the receiver in a case where the non-transmission symbol signal and the identification symbol signal are input from the dual-rail decoder; and a strobe signal generator receiving a write signal output from the dual-rail decoder, outputting the write signal to the memory, and masking the write signal corresponding to that the data invalid signal is input from the data invalid signal generator, wherein the dual-rail decoder outputs the receiving data to the memory, stores the receiving data in the memory by outputting the write signal to the memory while the receiving data is being output to the memory, outputs the identification symbol signal in a case of decoding the identification symbol included in the received fixed length serial transmit data, and outputs the non-transmission symbol signal in a case of decoding the non-transmission symbol included in the received fixed length serial transmission data.

6. The receiver according to claim 4, further comprising, a serial-to-parallel converter converting the receiving data output from the two-wire decoder in a predetermined bit number in parallel form and storing the receiving data converted in parallel form in the memory.

7. The receiver according to claim 4, further comprising, a data length setting unit extracting burst transmit data length information from the extracted received fixed length serial transmit data and setting a number of pieces of the transmit data of the burst transmit data length information as the predetermined number of pieces of data, wherein the fixed length serial transmission data of the dual-rail decoder receiving from the transmitter includes the number of pieces of the burst transmit data that is information of a number of pieces of the transmit data for transmitting at a time by burst transmission.

8. A receiver included in a fixed length serial burst data transfer system in which a transmitter and the receiver are coupled to each other through at least two data transmission lines, the receiver comprising:

a burst request transmitter transmitting a burst transmission request signal to the transmitter through a request signal line;

a memory storing receiving data;

a dual-rail decoder receiving fixed length serial transmit data from the transmitter, decoding encoded transmit data symbols based on an identification symbol included in the received fixed length serial transmit data, and storing the decoded fixed length serial transmit data in the memory as receiving data, the fixed length serial transmit data having binary digits to transmit data symbols each predetermined to correspond to each piece of the transmit data, having the identification symbol inserted between the encoded transmit data symbols so as to be encoded to identify the transmit data symbols one from another, and being output to the receiver through the two data transmission lines during transmission, while a non-transmission symbol indicating a non-transmission state is output to the receiver through the two data transmission lines during non-transmission;

a receiving data counter counting a number of pieces of the receiving data stored in the memory by the dual-rail decoder;

a detector detecting if the number of pieces of the receiving data counted by the receiving data counter is a predetermined number of pieces of data, and outputting a detection signal if the detected number of the pieces of the receiving data is the predetermined number of pieces of data; and a receiving completion reporter transmitting a receiving completion signal corresponding to receiving the detection signal from the detector.

9. A method for transmitting by a transmitter included in a fixed length serial burst data transmission system in which the transmitter and a receiver are coupled to each other through at least two data transmission lines, the method comprising:

encoding fixed length serial transmit data having binary digits to transmit data symbols each predetermined to correspond to each piece of the transmit data;

inserting an identification symbol between the encoded transmit data symbols so as to be encoded to identify the transmit data symbols one from another; and transmitting the encoded transmit data to the receiver through the two data transmission lines during transmission, while transmitting a non-transmission symbol indicating a non-transmission state to the receiver through the two data transmission lines during non-transmission.

10. The method for transmitting by the transmitter according to claim 9, further comprising:

counting a number of the transmit data symbols encoded and transmitted;

detecting if a counted number of pieces of the transmit data is a predetermined number of data;

outputting a last data signal if the counted number is detected as the predetermined number of data; and transmitting the non-transmission symbol to the receiver through the two data transmission lines corresponding to that the last data signal is input.

11. A method for transmitting by a transmitter included in a fixed length serial burst data transmission system in which the transmitter and a receiver are coupled to each other through at least a request signal line and two data transmission lines, the method comprising:

encoding fixed length serial transmit data having binary digits to transmit data symbols each predetermined to correspond to each piece of the transmit data;

inserting an identification symbol between the encoded transmit data symbols so as to be encoded to identify the transmit data symbols one from another; and transmitting the encoded transmit data to the receiver through the two data transmission lines during transmission, while transmitting a non-transmission symbol indicating a non-transmission state to the receiver through the two data transmission lines during non-transmission, corresponding to that the transmitter receives a burst transmission request signal from the receiver through the request signal line.

12. A method for receiving by a receiver included in a fixed length serial burst data transmission system in which a transmitter and the receiver are coupled to each other through at least two data transmission lines, the method comprising:
receiving the fixed length serial transmit data from the transmitter, the fixed length serial transmit data having binary digits to transmit data symbols each predetermined to correspond to each piece of the transmit data, having an identification symbol inserted between the encoded transmit data symbols so as to be encoded to identify the transmit data symbols one from another, and being output to the receiver through the two data transmission lines during transmission, while a non-transmission symbol indicating a non-transmission state is output to the receiver through the two data transmission lines during non-transmission;
decoding transmit data symbols having been encoded based on the identification symbol included in the received fixed length serial transmit data so as to store the transmit data as receiving data in the memory;
counting a number of pieces of the receiving data stored in the memory;
detecting if the counted number of the pieces of the receiving data number is a predetermined number of pieces of data;
outputting a detection signal if the number of the pieces of the receiving data is detected as the predetermined number of pieces of data; and
transmitting a receiving completion signal to the transmitter corresponding to that the detection signal is input.

13. The method for receiving by the receiver according to claim 12, further comprising:
outputting the receiving data to the memory;
storing the receiving data in the memory by transmitting a write signal to the memory while the receiving data is being output to the memory;
outputting an identification symbol signal in a case of decoding the identification symbol included in the received fixed length serial transmit data;
outputting a non-transmission symbol signal in a case of decoding the non-transmission signal included in the received fixed length serial transmission data;
outputting a data invalid signal for indicating that the receiving data is not stored from when the non-transmission symbol signal is input until when the identification symbol signal is input to the receiver in a case where the non-transmission symbol signal and the identification symbol signal are input from the dual-rail decoder, and
masking the write signal corresponding to that the data invalid signal is input.

14. The method for receiving by the receiver according to claim 12, further comprising:
converting the receiving data in a predetermined bit number in parallel form; and
storing the receiving data converted in parallel form in the memory.

15. The method for receiving by the receiver according to claim 12, further comprising:
extracting burst transmit data length information from the received fixed length serial transmit data; and
setting a number of pieces of the transmit data of the extracted burst transmit data length information as the predetermined number of data, wherein the received fixed length serial transmission data includes the number of pieces of the burst transmit data that is information of the number of the pieces of the transmit data for transmitting at a time by burst transmission.

16. A method for receiving by a receiver included in a fixed length serial burst data transmission system in which a transmitter and the receiver are coupled to each other through at least two data transmission lines, the method comprising:
transmitting a burst transmission request signal to the transmitter through a request signal line;
receiving the fixed length serial transmit data from the transmitter, the fixed length serial transmit data having binary digits to transmit data symbols each predetermined to correspond to each piece of the transmit data, having an identification symbol inserted between the encoded transmit data symbols so as to be encoded to identify the transmit data symbols one from another, and being output to the receiver through the two data transmission lines during transmission, while a non-transmission symbol indicating a non-transmission state is output to the receiver through the two data transmission lines during non-transmission;
decoding transmit data symbols having been encoded based on the identification symbol included in the received fixed length serial transmit data so as to store the transmit data as receiving data in the memory;
counting a number of pieces of the receiving data stored in the memory;
detecting if the counted number of the pieces of the receiving data number is a predetermined number of pieces of data;
outputting a detection signal if the number of the pieces of the receiving data is detected as the predetermined number of pieces of data; and
transmitting a receiving completion signal corresponding to that the detection signal is input.

17. A fixed length serial burst data transmission system, comprising:
a transmitter; and
a receiver being coupled to the transmitter through at least two data transmission lines, the transmitter including:
a dual-rail encoder encoding fixed length serial transmit data having binary digits to transmit data symbols each predetermined to correspond to each piece of the transmit data, inserting an identification symbol between the encoded transmit data symbols so as to be encoded to identify the transmit data symbols one from another, and transmitting the encoded transmit data to the receiver through the two data transmission lines during transmission, while transmitting a non-transmission symbol indicating a non-transmission state to the receiver through the two data transmission lines during non-transmission, while the receiver including:
a memory storing receiving data;
a dual-rail decoder receiving fixed length serial transmit data from the transmitter, decoding encoded transmit data symbols based on an identification symbol included in the received fixed length serial transmit data, and storing the decoded fixed length serial transmit data in the memory as receiving data;
a receiving data counter counting a number of pieces of the receiving data stored in the memory by the dual-rail decoder;
a detector detecting if the number of pieces of the receiving data counted by the receiving data counter is a predetermined number of pieces of data, and outputting a detection signal if the detected number of the pieces of the receiving data is the predetermined number of pieces of data; and a receiving completion reporter transmitting a receiving completion signal to the transmitter corresponding to receiving the detection signal from the detector.

18. The fixed length serial burst data transmission system according to claim 17, wherein the data transmission lines are made of metal.

19. The fixed length serial burst data transmission system according to claim 17, wherein the data transmission lines are made of an optic fiber, and the dual-rail encoder includes a light emitter outputting at least one of transmit symbols among transmit data symbols, an identification symbol, and a non-transmission symbol through the optic fiber, while the dual-rail decoder includes a light receiver to receive the transmit symbols through the optic fiber.

20. The fixed length serial burst data transmission system according to claim 19, wherein the light emitter performs high-frequency modulation on an optical output corresponding to the transmit symbol, while the light receiver receives and decodes high-frequency light being modulated corresponding to the transmit symbol.

21. A semiconductor device, comprising the fixed length serial burst data transmission system according to claim 17, the transmission system formed on a single silicon substrate.

22. A hybrid semiconductor device, comprising the fixed length serial burst data transmission system according to claim 17, the transmission system formed on a plurality of various silicon substrates.

23. A fixed length serial burst data transmission system, comprising:

a transmitter; and a receiver being coupled to the transmitter through at least a request signal line and two data transmission lines, the transmitter including:

a burst request receiver receiving a burst transmission request signal from the receiver; and a dual-rail encoder encoding fixed length serial transmit data having binary digits to transmit data symbols each predetermined to correspond to each piece of the transmit data, inserting an identification symbol between the encoded transmit data symbols so as to be encoded to identify the transmit data symbols one from another, and transmitting the encoded transmit data to the receiver through the two data transmission lines during transmission, while transmitting a non-transmission symbol indicating a non-transmission state to the receiver through the two data transmission lines during non-transmission, corresponding to that the burst request receiver receives the burst transmission request signal, while the receiver including:

a burst request transmitter transmitting the burst transmission request signal to the transmitter;

a memory storing receiving data;

a dual-rail decoder receiving the encoded fixed length serial transmit data from the transmitter, decoding the encoded transmit data symbols based on an identification symbol included in the received fixed length serial transmit data so as to store as the receiving data in the memory;

a receiving data counter counting a number of pieces of the receiving data stored in the memory by the dual-rail decoder;

a detector detecting if the number of pieces of the receiving data counted by the receiving data counter is a predetermined number of pieces of data, and outputting a detection signal if the detected number of the pieces of the receiving data is the predetermined number of pieces of data; and a receiving completion reporter transmitting a receiving completion signal corresponding to receiving the detection signal from the detector.

* * * * *